US 7,603,036 B2

(12) United States Patent
Palacharla et al.

(10) Patent No.: US 7,603,036 B2
(45) Date of Patent: Oct. 13, 2009

(54) SYSTEM AND METHOD FOR MANAGING NETWORK COMPONENTS IN A HYBRID PASSIVE OPTICAL NETWORK

(75) Inventors: Paparao Palacharla, Richardson, TX (US); Martin Bouda, Plano, TX (US); Takao Naito, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 491 days.

(21) Appl. No.: 11/552,696

(22) Filed: Oct. 25, 2006

(65) Prior Publication Data

US 2007/0166037 A1 Jul. 19, 2007

Related U.S. Application Data

(60) Provisional application No. 60/756,925, filed on Jan. 6, 2006.

(51) Int. Cl.
*H04J 14/00* (2006.01)
*H04J 4/00* (2006.01)
(52) U.S. Cl. .......................................... 398/72; 398/75
(58) Field of Classification Search ............. 398/70–72, 398/74, 75
See application file for complete search history.

(56) References Cited

U.S. PATENT DOCUMENTS

| | | | |
|---|---|---|---|
| 4,555,810 A | 11/1985 | Khoe et al. | |
| 5,285,305 A | 2/1994 | Cohen et al. | |
| 5,321,541 A | 6/1994 | Cohen | |
| 5,440,416 A | 8/1995 | Cohen et al. | |
| 5,579,421 A | 11/1996 | Duvall et al. | |
| 5,694,234 A | 12/1997 | Darcie et al. | |
| 5,926,298 A | 7/1999 | Li | |

(Continued)

FOREIGN PATENT DOCUMENTS

EP 1 028 331 A2 8/2000

(Continued)

OTHER PUBLICATIONS

Gigabit-capable Passive Optical Networks (G-PON): Transmission convergence layer specification. International Telecommunication Union, ITU-T G.984.3, Feb. 2004, pp. 1-107; [online], [retrieved on Apr. 23, 2009]. Retrieved from the Internet <URL: http://www.itu.int/rec/T-REC-G.984.3-200402-S/en>.*

(Continued)

*Primary Examiner*—Nathan M Curs
(74) *Attorney, Agent, or Firm*—Baker Botts L.L.P.

(57) ABSTRACT

A method includes transmitting, at a first wavelength, a first configuration message on the PON including a first transmitter interface number and transmitting, at a second wavelength, a second configuration message on the PON including a second transmitter interface number. The method further includes receiving a configuration response message from a first set of ONUs that comprises the first transmitter interface number and from a second set of ONUs that comprises the second transmitter interface, associating the first set of ONUs with the first wavelength and the second set of ONUs with the second wavelength, and transmitting downstream traffic destined for any ONU in the first set of ONUs at the first wavelength and transmitting downstream traffic for any ONU in the second set of ONUs at the second wavelength.

18 Claims, 4 Drawing Sheets

U.S. PATENT DOCUMENTS

| | | | |
|---|---|---|---|
| 6,144,472 | A | 11/2000 | Knox |
| 6,163,637 | A | 12/2000 | Zirngibl |
| 6,411,410 | B1* | 6/2002 | Wright et al. ............... 398/79 |
| 6,498,876 | B1 | 12/2002 | Liu et al. |
| 6,767,139 | B2 | 7/2004 | Brun et al. |
| 7,245,829 | B1 | 7/2007 | Sindile |
| 7,389,048 | B2 | 6/2008 | Kani et al. |
| 2002/0196491 | A1 | 12/2002 | Deng et al. |
| 2003/0002102 | A1 | 1/2003 | Khalfallah et al. |
| 2004/0001718 | A1 | 1/2004 | Matthews et al. |
| 2004/0131357 | A1 | 7/2004 | Farmer et al. |
| 2004/0184806 | A1 | 9/2004 | Lee et al. |
| 2005/0129404 | A1 | 6/2005 | Kim et al. |
| 2005/0175343 | A1 | 8/2005 | Huang et al. |
| 2005/0175344 | A1 | 8/2005 | Huang et al. |
| 2005/0180689 | A1 | 8/2005 | Kozhevnikov et al. |
| 2005/0265719 | A1* | 12/2005 | Bernard ..................... 398/58 |
| 2006/0056849 | A1 | 3/2006 | Pamart et al. |
| 2006/0067692 | A1* | 3/2006 | Park et al. .................. 398/75 |
| 2006/0153567 | A1* | 7/2006 | Kim et al. ................... 398/72 |
| 2007/0092249 | A1 | 4/2007 | Akasaka et al. |
| 2007/0092250 | A1 | 4/2007 | Bouda et al. |
| 2007/0092251 | A1 | 4/2007 | Bouda et al. |
| 2007/0092252 | A1 | 4/2007 | Bouda et al. |
| 2007/0092253 | A1 | 4/2007 | Bouda |
| 2007/0092254 | A1 | 4/2007 | Bouda |
| 2007/0092255 | A1 | 4/2007 | Bouda |
| 2007/0166037 | A1 | 7/2007 | Palacharla et al. |
| 2007/0166043 | A1 | 7/2007 | Bouda |
| 2007/0183779 | A1 | 8/2007 | Bouda |
| 2007/0280690 | A1 | 12/2007 | Bouda |
| 2007/0280691 | A1 | 12/2007 | Bouda |
| 2008/0273877 | A1* | 11/2008 | Palacharla et al. ........... 398/64 |

FOREIGN PATENT DOCUMENTS

| | | |
|---|---|---|
| EP | 1 130 806 A2 | 9/2001 |
| EP | 1 434 375 A2 | 6/2004 |
| WO | WO 2007/047559 | 4/2007 |
| WO | WO 2007/081748 | 7/2007 |

OTHER PUBLICATIONS

Son et al., "Bidirectional WDM Passive Optical Network for Simultaneous Transmission of Data and Digital Broadcast Video Service," Journal of Lightwave Technology, vol. 21, No. 8, Aug. 2003, pp. 1723-1727.

Ching et al., "Passive Optical Networks," Sharing the Fiber, Telecom Equipment-Wireline, Merrill Lynch, May 15, 2001, pp. 1-27.

Kuhlow et al., "AWG-Based Device for a WDM Overlay PON in the 1.5-μm Bank," IEEE Photonics Technology Letters, vol. 11, No. 2, Feb. 1999, pp. 218-220.

Feldman et al., "An Evaluation of Architectures Incorporating Wavelength Division Multiplexing for Broad-Bank Fiber Access," Journal of Lightwave Technology, vol. 16, No. 9, Invited Paper, Sep. 1998, pp. 1546-1559.

Giles et al., "Access PON Using Downstream 1550-nm WDM Routing and Upstream 1300-nm SCMA Combining Through a Fiber-Grating Route," IEEE Photonics Technology Letters, vol. 8, No. 11, Nov. 1996, pp. 1549-1551.

Hilbk et al., "High Capacity WDM Overlay on a Passive Optical Network," Electronic Letters, Nov. 7, 1996, vol. 32, No. 23, pp. 2162-2163.

Inoue et al., "Silica-based Arrayed-Waveguide Grating Circuit as Optical Splitter/Router," Electronic Letters, Apr. 27, 1995, vol. 31, No. 9, pp. 726-727.

Kashima, "Upgrade of Passive Optical Subscriber Network," Journal of Lightwave Technology, vol. 9, No. I, Jan. 1991, pp. 113-120.

Lin, "Passive Optical Subscriber Loops with Multiaccess," Journal of Lightwave Technology, vol. 7, No. 11, Nov. 1989, pp. 1769-1777.

MOOG Component Group, "(Mems)* Singlemode Fiber Optic Switch," F05935, 2 pages, 2005.

Light Reading—Networking the Telecom Industry, PON & FTTx Update, Introduction, Aug. 8, 2005, *Light Reading*, Aug. 8, 2005, printed from web site Jan. 26, 2006, pp. 1-11, Retrieved from website Aug. 8, 2005.

ITU-T Telecommunication Standardization Sector of ITU-T, G.983.1, "Gigabit-Capable Passive Optical Network (GPON): General Characteristics," Series G: Transmission Systems and Media, Digital Systems and Networks, Digital Sections and Digital Line System—Optical Line Systems for Local and Access Networks, Mar. 2003, 20 pages.

ITU-T Telecommunication Standardization Sector of ITU-T G.983.1, "Broadband Optical Access Systems Based on Passive Optical Networks (PON)," Series G: Transmission Systems and Media, Digital Systems and Networks, Digital Sections and Digital Line System—Optical Line Systems for Local and Access Networks, 124 pages, Jan. 2005, 123 pages.

ITU-T Telecommunication Standardization Sector of ITU-T, G.983.3, "A Broadband Optical Access System with Increased Service Capability by Wavelength Allocation," Series G: Transmission Systems and Media, Digital Systems and Networks, Digital Sections and Digital Line System—Optical Line Systems for Local and Access Networks, Mar. 2001, 59 pages.

Green, Paul E. Jr., Telecommunications Consultant, "Fiber-to-the-Home White Paper,", Feb. 21, 2003, pp. 1-21.

Park et al.; "Bidirectional Wavelength-Division-Multiplexing Self-Healing Passive Optical Network," Network Research Team, Telecommunications R&D Center, Samsung Electronics; 2005 Optical Society of America, 3 pages, Mar. 6, 2005.

Son et al.; "Survivable Network Architectures for WDM PON;" Korea Advanced Institute of Science and Technology; 2005 Optical Society of America, 3 Pages, Mar. 6, 2005.

Smith, Stephen, "Business Class Services Over a GPON Network," Fujitsu Network Communications; 10 pages, Mar. 5, 2006.

Wang et al.; "A Novel Centrally Controlled Protection Scheme for Traffic Restoration in WDM Passive Optical Networks;" IEEE Photonics Technology Letters, vol. 17, No. 3; Mar. 2005, pp. 717-719.

Suzuki et al.; "A Reliable Wide-Area WDM-PON Using Wavelength-Shifted Protection Scheme;" Access Network Service Systems Laboratories, NTT Corporation; 2 pages, Sep. 25, 2005.

ITU—Telecommunication Standardization Sector Study Group 15; "Recommendation G.983.5: A Broadband Optical Access System with Enhanced Survivability (for consent);" Editor, Recommendation G.983.5; 45 pages, Oct. 15, 2001 through Oct. 26, 2001.

Phillips et al.; "Redundancy Strategies for a High Splitting Optically Amplified Passive Optical Network," Journal of Lightwave Technology, vol. 19, No. 2; pp. 137-149, Feb. 2001.

Chan et al.; "A Novel Bidirectional Wavelength Division Multiplexed Passive Optical Network with 1:1 Protection;" Friday Morning, OFC, vol. 2; pp. 779-781, 2003.

Sun et al.; "A Novel Star-Ring Protection Architecture Scheme for WDM Passive Optical Access Networks;" Department of Information Engineering, The Chinese University of Hong Kong; 3 pages, Mar. 6, 2005.

Hirth, Ryan, "1 Gbps to 10 Gbps Migration," Teknovus, Access the Future, IEEE Meeting, Jul. 2006, San Diego, CA, pp. 1-7.

Diouf, Leopold, "Next Generation Access (NGA)," An Alcatel-Lucent Contribution to NGA, FSAN Meeting, Munich, Germany, Feb. 7-9, 2007, pp. 1-30, published on FSAN website Jan. 31, 2007.

Handley et al., "A Comparison of WDM PON Architectures," Proceedings of the European Conference on Network and Optical Communications, Broadband Access and Technology. Amsterdam, IOS Press, NL, vol., part 1, pp. 141-147, Jan. 1, 1999.

International Searching Authority, "Notification of Transmittal of the International Search Report and the Written Opinion of the International Searching Authority, or the Declaration," (PCT Rule 44.1), International Application No. PCT/US2006/040318, mailed Feb. 14, 2007, 13 pages.

International Searching Authority, "Notification of Transmittal of the International Search Report and the Written Opinion of the International Searching Authority, or the Declaration," (PCT Rule 44.1), International Application No. PCT/US2006/040330, mailed Feb. 19, 2007, 13 pages.

International Searching Authority, "Notification of Transmittal of the International Search Report and the Written Opinion of the International Searching Authority, or the Declaration," (PCT Rule 44.1), International Application No. PCT/US2006/040605, 14 pages, mailed Feb. 14, 2007, 14 pages.

Bouda, "A Hybrid Passive Optical Network Using Shared Wavelengths," filed Feb. 3, 2006, 64 pps., 9 pps. drawings, U.S. Appl. No. 11/347,434.

Bouda, "A Distribution Node for a Wavelength-Sharing Network," filed Feb. 3, 2006, 64 pps., 9 pps. drawings, U.S. Appl. No. 11/347,612.

Bouda et al., "Distribution Components for a Wavelength-Sharing Network," filed Feb. 3, 2006, 69 pps., 9 pps. drawings, U.S. Appl. No. 11/347,585.

Bouda et al., "Upgradeable Passive Optical Network," filed Feb. 3, 2006, 66 pps, 9 pps. drawings, U.S. Appl. No. 11/347,446.

Bouda, "System and Method for Transmitting Traffic in a Plurality of Passive Optical Networks," U.S. Appl. No. 11/627,809, filed Jan. 26, 2007, 35 ppgs., 5 pps. drawings.

Bouda, "System and Method for Transmitting Upstream Traffic in an Optical Network," U.S. Appl. No. 11/426,875, filed Jun. 27, 2006, 49 ppgs., 5 pps. drawings.

Bouda, "System and Method for Managing Different Transmission Architectures in a Passive Optical Network," U.S. Appl. No. 11/627,793, 42 pps., 4 pps. drawings, filed Jan. 26, 2007.

Bouda, "System and Method for Distributing Traffic in an Optical Network," U.S. Appl. No. 11/426,879, filed Jun. 27, 2006, 43 pps., 5 pps. drawings.

Akasaka et al., "System and Method for Traffic Distribution in an Optical Network," U.S. Appl. No. 11/426,884, filed Jun. 27, 2006, 71 pps., 12 pps. drawings.

Bouda et al., "Method and System for Increasing Downstream Bandwidth in an Optical Network," filed Jan. 5, 2007, 42 pps., 10 pps. drawings, U.S. Appl. No. 11/620,144.

Bouda, "Distribution Node for an Optical Network," filed Jan. 4, 2007, 38 pps., 6 pps. drawings, U.S. Appl. No. 11/619,945.

Akasaka et al., "System and Method for Protecting an Optical Network," filed Dec. 11, 2006, 42 pps., 4 pps. drawings, U.S. Appl. No. 11/609,120.

Bouda et al., "System and Method for Extending Reach in a Passive Optical Network," filed Jan. 31, 2007, 51 pps, 5 pps. drawings, U.S. Appl. No. 11/669,657.

Bouda, "System and Method for Transmitting Optical Markers in a Passive Optical Network System," 52 pps., 5 pps. drawings, filed Jan. 31, 2007, U.S. Appl. No. 11/669,667.

International Searching Authority, "Notification of Transmittal of the International Search Report and the Written Opinion of the International Searching Authority, or the Declaration," (PCT Rule 44.1), International Application No. PCT/US2006/042224, mailed Mar. 5, 2007, 13 pages.

International Searching Authority, "Notification of Transmittal of the International Search Report and the Written Opinion of the International Searching Authority, or the Declaration," (PCT Rule 44.1), International Application No. PCT/US2006/040597, mailed Mar. 5, 2007, 15 pages.

International Searching Authority, "Notification of Transmittal of the International Search Report and the Written Opinion of the International Searching Authority, or the Declaration," (PCT Rule 44.1), International Application No. PCT/US2006/042220, mailed Mar. 12, 2007, 12 pages.

Zang et al., "A Review of Routing and Wavelength Assignment Approaches for Wavelength-Routed Optical WDM Networks," Optical Networks Magazine, SPIE, Bellingham, WA, US, vol. 1, No. 1, Jan. 2000, pp. 47-60.

Bouda, "System and Method for Protecting an Optical Network," U.S. Appl. No. 11/680,186, filed Feb. 28, 2007, 35 pps., 6 pps. drawings.

International Searching Authority, "Notification of Transmittal of the International Search Report and the Written Opinion of the International Searching Authority, or the Declaration," (PCT Rule 44.1), International Application No. PCT/US2006/043188, mailed Mar. 14, 2007, 12 pages.

Langer et al, "Promising Evolution Paths for Passive Optical Access Networks," Proceedings of 2004 6th International Conference on Warsaw, Poland, Jul. 4, 2004 through Jul. 7, 2004, IEEE vol. 1, pp. 202-207.

International Searching Authority, "Notification of Transmittal of the International Search Report and the Written Opinion of the International Searching Authority, or the Declaration," (PCT Rule 44.1), International Application No. PCT/US2007/002955, mailed Jun. 28, 2007, 11 pages.

Wagner et al., "Technology and System Issues for a WDM-Based Fiber Loop Architecture," Journal of Lightwave Technology, IEEE Service Center, New York, NY, vol. 7, No. 11, Nov. 1, 1989, pp. 1759-1768.

Frigo et al., "A Wavelength-Division Multiplexed Passive Optical Network with Cost-Shared Components," IEEE Photonics Technology Letters, IEEE Service Center, Piscataway, NJ, vol. 4, No. 11, Nov. 1, 1994, pp. 1365-1367.

Oakley, "An Economic Way to See in the Broadband Dawn," Institute of Electrical and Electronics Engineers, Communications for the Information Age, Proceedings of the Global Telecommunications Conference and Exhibition (Globecom), New York, IEEE, vol. 3, Nov. 28, 1988, pp. 1574-1578.

International Searching Authority, "Notification of Transmittal of the International Search Report and the Written Opinion of the International Searching Authority, or the Declaration," (PCT Rule 44.1), International Application No. PCT/US2007/000184, mailed Jul. 27, 2007, 13 pages.

Asatani et al., "A Field Trial of Fiber Optic Subscriber Loop Systems Utilizing Wavelength-Division Multiplexers," IEEE Transactions on Communications, IEEE Service Center, Piscataway, NJ, vol. COM-30, No. 9, Sep. 1982, pp. 2172-2184.

Cheng et al., "Integrated a Hybrid CATV/GPON Transport System Based on 1.31/1.49/1.55um WDM Transceiver Module," 2005 Quantum Electronics and Laser Science Conference, pp. 1678-1680, 2005.

Palacharla et al.., System and Method for Managing Communication in a Hybrid Passive Optical Network, filed May 2, 2007, U.S. Appl. No. 11/743,311, 50 pages, 6 pages of drawings.

International Searching Authority, "Notification of Transmittal of the International Search Report and the Written Opinion of the International Searching Authority, or the Declaration," (PCT Rule 44.1), International Application No. PCT/US2007/000189, mailed Jul. 18, 2007, 12 pages.

International Searching Authority, "Notification of Transmittal of the International Search Report and the Written Opinion of the International Searching Authority, or the Declaration," (PCT Rule 44.1), International Application No. PCT/US2007/002851, mailed Aug. 21, 2007, 11 pages.

European Patent Office, European Search Report and Office Action, Application No. 07010686-9-2415, mailed Aug. 21, 2007, 14 pages.

Son et al., "Bidirectional Passive Optical Network for the Transmission of WDM Channels with Digital Broadcast Video Signals," Optical Society of America/Institute of Electrical and Electronics Engineers, Optical Fiber Communication Conference and Exhibit (OFC). Technical Digest, Post Conference Digest, Mar. 17-22, 2002, Trends in Optical and Photonic Series, pp. 767-768.

International Telecommunication Union, ITU-T Telecommunication Standardization Sector of ITU, "Gigabit-Capable Passive Optical Networks (G-PON): Transmission Convergence Layer Specification," Series G: Transmission Systems and Media, Digital Systems and Networks, ITU-T G.984.3, 116 pages, Feb. 2004.

Editor Recommendation G.984.3, International Telecommunication Union, Telecommunication Standardization Section, Study Period 2005-2008, "Updated Revised Amendment 1 to G.984.3, Gigabit-Capable Passive Optical Networks (G-PON): Transmission Convergence Layer Specification (for consent)," pp. 1-39, May 16, 2005 through May 27, 2005.

* cited by examiner

| TRANSMITTER TXIF NUMBER | RECEIVER RXIF NUMBER | ONU SERIAL NUMBER | ONU-ID | OMCC PORT-ID | PORT-ID (SERVICES) |
|---|---|---|---|---|---|
| $T_1$ | R | $SN_{a1}$ | $ONU_{a1}$ | $OMCC_{a1}$ | $P_{a1x}, P_{a1y}, P_{a1z}\ldots$ |
| | | $SN_{a2}$ | $ONU_{a2}$ | $OMCC_{a2}$ | $P_{a2x}, P_{a2y}, P_{a2z}\ldots$ |
| | | $SN_{a3}$ | $ONU_{a3}$ | $OMCC_{a3}$ | $P_{a3x}, P_{a3y}, P_{a3z}\ldots$ |
| | | $\vdots$ | $\vdots$ | $\vdots$ | |
| | | $SN_{an}$ | $ONU_{an}$ | $OMCC_{an}$ | $P_{anx}, P_{any}, P_{anz}\ldots$ |
| $\vdots$ | | $\vdots$ | $\vdots$ | $\vdots$ | $\vdots$ |
| $T_m$ | | $SN_{m1}$ | $ONU_{m1}$ | $OMCC_{m1}$ | $P_{m1x}, P_{m1y}, P_{m1z}\ldots$ |
| | | $SN_{m2}$ | $ONU_{m2}$ | $OMCC_{m2}$ | $P_{m2x}, P_{m2y}, P_{m2z}\ldots$ |
| | | $SN_{m3}$ | $ONU_{m3}$ | $OMCC_{m3}$ | $P_{m3x}, P_{m3y}, P_{m3z}\ldots$ |
| | | $\vdots$ | $\vdots$ | $\vdots$ | |
| | | $SN_{mn}$ | $ONU_{mn}$ | $OMCC_{mn}$ | $P_{mnx}, P_{mny}, P_{mnz}\ldots$ |

SYSTEM AND METHOD FOR MANAGING NETWORK COMPONENTS IN A HYBRID PASSIVE OPTICAL NETWORK

CROSS-REFERENCE TO RELATED APPLICATIONS

This application claims benefit under 35 U.S.C. § 119(e) of U.S. Provisional Application Ser. No. 60/756,925 filed Jan. 6, 2006 by Bouda, et. al, and entitled *Hybrid Passive Optical Network Components*.

TECHNICAL FIELD

The present invention relates generally to communication systems and, more particularly, to a system and method for managing network components in a hybrid passive optical network.

BACKGROUND

In recent years, a bottlenecking of communication networks has occurred in the portion of the network known as the access network. Bandwidth on longhaul optical networks has increased sharply through new technologies such as wavelength division multiplexing (WDM) and transmission of traffic at greater bit rates. Metropolitan-area networks have also seen a dramatic increase in bandwidth. However, the access network, also known as the last mile of the communications infrastructure connecting a carrier's central office to a residential or commercial customer site, has not seen as great of an increase in affordable bandwidth. The access network thus presently acts as the bottleneck of communication networks, such as the internet.

Power-splitting passive optical networks (PSPONs) offer one solution to the bottleneck issue. PSPONs refer to typical access networks in which an optical line terminal (OLT) at the carrier's central office transmits traffic over one or two downstream wavelengths for broadcast to optical network units (ONUs). In the upstream direction, ONUs typically time-share transmission of traffic in one wavelength. An ONU refers to a form of access node that converts optical signals transmitted via fiber to electrical signals that can be transmitted to individual subscribers and vice versa. PSPONs address the bottleneck issue by providing greater bandwidth at the access network than typical access networks. For example, networks such as digital subscriber line (DSL) networks that transmit traffic over copper telephone wires typically transmit at a rate between approximately 144 kilobits per second (Kb/s) and 1.5 megabits per second (Mb/s). Conversely, Broadband PONs (BPONs), which are example PSPONs, are currently being deployed to provide hundreds of megabits per second capacity shared by thirty-two users. Gigabit PONs (GPONs), another example of a PSPON, typically operate at speeds of up to 2.5 gigabits per second (Gb/s) by using more powerful transmitters, providing even greater bandwidth. Other PSPONs include, for example, asynchronous transfer mode PONs (APONs) and gigabit Ethernet PONs (GE-PONs).

Although PSPON systems provide increased bandwidth in access networks, demand continues to grow for higher bandwidth. One solution, wavelength division multiplexing PON (WDMPON), would increase downstream (and upstream) capacity dramatically but inefficiently. WDMPONs refer to access networks in which each ONU receives and transmits traffic over a dedicated downstream and upstream wavelength, respectively. Although WDMPONs would increase capacity dramatically, they would do so at a prohibitively high cost for many operators and would supply capacity far exceeding current or near-future demand. Because demand for greater capacity continues to grow (but not at a rate to justify adoption of WDMPONs in most cases), a need exists for cost-efficient solutions along the upgrade path from PSPONs to full WDMPONs.

SUMMARY

In accordance with the teachings of the present invention, a system and method for managing network components in a hybrid passive optical network (HPON), a hybrid between a PSPON and a WDMPON, is provided. In a particular embodiment, the method includes transmitting, at a first wavelength, a first configuration message on the PON, wherein the first configuration message comprises a first transmitter interface number. The method also includes transmitting, at a second wavelength and at approximately the same time as the first message, a second configuration message on the PON, wherein the second configuration message comprises a second transmitter interface number. The method further includes receiving a configuration response message from each of one or more optical network units (ONUs) in a first set of ONUs that comprises the first transmitter interface number and receiving a configuration response message from each of one or more ONUs in a second set of ONUs that comprises the second transmitter interface number. The method also includes, based on the configuration response messages from the first set and second set of ONUs, associating, in a database, each ONU in the first set of ONUs with the first wavelength and each ONU in the second set of ONUs with the second wavelength. The method further includes, using the database, transmitting downstream traffic destined for any ONU in the first set of ONUs at the first wavelength and transmitting downstream traffic for any ONU in the second set of ONUs at the second wavelength.

Technical advantages of one or more embodiments of the present invention may include using an auto-discovery of reachability scheme in an HPON to allow the OLT and ONUs in the HPON to communicate suitably. To allow such communication, in particular embodiments, the auto-discovery of reachability scheme may associate, at the OLT, particular transmitted downstream wavelengths with the one or more ONUs receiving traffic in the particular wavelengths. Such associations may be made one wavelength at a time in particular embodiments or concurrently for all wavelengths in alternative embodiments.

In particular embodiments, the auto-discovery schemes used in the HPON may provide an efficient technique for determining reachability. In an upgrade to HPON from PSPON, an efficient auto-discovery scheme may be one that does not substantially deviate from the PSPON messaging scheme being upgraded. An efficient auto-discovery scheme may also be one, for example, that does not require substantial changes to PSPON components or to the PSPON architecture generally. As an example only, in an upgrade from GPON to HGPON, an efficient scheme for auto-discovery of ONU reachability may be one that does not substantially deviate from the G.984.3 GPON protocol and/or one that does not require changes to ONU hardware.

It will be understood that the various embodiments of the present invention may include some, all, or none of the enumerated technical advantages. In addition other technical advantages of the present invention may be readily apparent to one skilled in the art from the figures, description, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
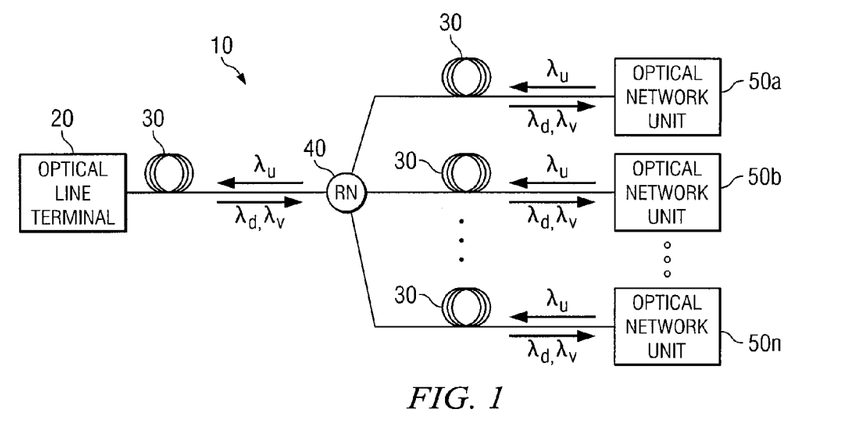
FIG. 1 is a diagram illustrating an example PSPON.

FIG. 1 is a diagram illustrating an example Power Splitting Passive Optical Network (PSPON) 10. Typically, PSPONs have been employed to address the bottlenecking of communications networks in the portion of the network known as the access network. In recent years, bandwidth on longhaul optical networks has increased sharply through new technologies such as wavelength division multiplexing (WDM) and transmission of traffic at greater bit rates. In addition, metropolitan-area networks have also seen a dramatic increase in bandwidth. However, the access network, also known as the last mile of the communications infrastructure connecting a carrier's central office to a residential or commercial customer site, has not seen as great of an increase in affordable bandwidth. The access network thus presently acts as the bottleneck of communication networks, such as the internet.

PSPONs address the bottleneck issue by providing greater bandwidth at the access network than typical access networks. For example, networks such as digital subscriber line (DSL) networks that transmit traffic over copper telephone wires typically transmit at a rate between approximately 144 kilobits per second (Kb/s) and 1.5 megabits per second (Mb/s). Conversely, broadband PONs (BPONs) are currently being deployed to provide hundreds of megabits per second capacity shared by thirty-two users. Gigabit PONs (GPONs), which typically operate at speeds of up to 2.5 gigabits per second (Gb/s) by using more powerful transmitters, provide even greater bandwidth.

Referring back to PSPON 10 of FIG. 1, PSPON 10 includes an Optical Line Terminal (OLT) 20, optical fiber 30, a Remote Node (RN) 40, and Optical Network Units (ONUs) 50. PSPON 10 refers to typical access networks in which an optical line terminal (OLT) at the carrier's central office transmits traffic over one or two downstream wavelengths for broadcast to optical network units (ONUs). PSPON 10 may be an asynchronous transfer mode PON (APON), a BPON, a GPON, a gigabit Ethernet PON (GEPON), or any other suitable PSPON. A feature common to all PSPONs 10 is that the outside fiber plant is completely passive. Downstream signals transmitted by the OLT are passively distributed by the RN to downstream ONUs coupled to the RN through branches of fiber, where each ONU is coupled to the end of a particular branch. Upstream signals transmitted by the ONUs are also passively forwarded to the OLT by the RN.

OLT 20, which may be an example of an upstream terminal, may reside at the carrier's central office, where it may be coupled to a larger communication network. OLT 20 includes a transmitter operable to transmit traffic in a downstream wavelength, such as $\lambda_d$, for broadcast to all ONUs 50, which may reside at or near customer sites. OLT 20 may also include a transmitter operable to transmit traffic in a second downstream wavelength $\lambda_v$ (which may be added to $\lambda_d$) for broadcast to all ONUs 50. As an example, in typical GPONs, $\lambda_v$ may carry analog video traffic. Alternatively, $\lambda_v$ may carry digital data traffic. OLT 20 also includes a receiver operable to receive traffic from all ONUs 50 in a time-shared upstream wavelength, $\lambda_u$. In typical PSPONs, downstream traffic in $\lambda_d$ and $\lambda_v$ is transmitted at a greater bit rate than is traffic in Bun as PSPONs typically provide lower upstream bandwidth than downstream bandwidth. It should be noted that "downstream" traffic refers to traffic traveling in the direction from the OLT (or upstream terminal) to the ONUs (or downstream terminals), and "upstream" traffic refers to traffic traveling in the direction from the ONUs (or downstream terminals) to the OLT (or upstream terminal). It should further be noted that $\lambda_d$ may include the band centered around 1490 nm, $\lambda_v$ may include the band centered around 1550 nm, and $\lambda_u$ may include the band centered around 1311 nm in particular PSPONs.

Optical fiber 30 may include any suitable fiber to carry upstream and downstream traffic. In certain PSPONs 10, optical fiber 30 may comprise, for example, bidirectional optical fiber. In other PSPONs 10, optical fiber 30 may comprise two distinct fibers. RN 40 of PSPON 10 (which may also generally be referred to as a distribution node) comprises any suitable power splitter, such as an optical coupler, and connects OLT 20 to ONUs 50. RN 40 is located in any suitable location and is operable to split a downstream signal such that each ONU 50 receives a copy of the downstream signal. Due to the split and other possible power losses, each copy forwarded to an ONU has less than 1/N of the power of the downstream signal received by RN 40, where N refers to the number of ONUs 50. In addition to splitting downstream signals, RN 40 is also operable to combine into one signal upstream, time-shared signals transmitted by ONUs 50. RN 40 is operable to forward the upstream signal to OLT 20.

ONUs 50 (which may be examples of downstream terminals) may include any suitable optical network unit or optical network terminal (ONT) and generally refer to a form of access node that converts optical signals transmitted via fiber to electrical signals that can be transmitted to individual subscribers. Subscribers may include residential and/or commercial customers. Typically, PONs 10 have thirty-two ONUs 50 per OLT 20, and thus, many example PONs may be described as including this number of ONUs. However, any suitable number of ONUs per OLT may be provided. ONUs 50 may include triplexers that comprise two receivers to receive downstream traffic (one for traffic in $\lambda_d$ and the other for traffic in $\lambda_v$) and one transmitter to transmit upstream traffic in $\lambda_u$. The transmission rate of the ONU transmitter is typically less than the transmission rate of the OLT transmitter (due to less demand for upstream capacity than for downstream capacity). Each ONU 50 is operable to process its designated downstream traffic and to transmit upstream traffic according to an appropriate time-sharing protocol (such that the traffic transmitted by one ONU in $\lambda_u$ does not collide with the traffic of other ONUs in $\lambda_u$).

In operation, the OLT 20 of a typical PSPON 10 transmits downstream traffic destined for one or more of ONUs 50 in $\lambda_d$. OLT 20 may also transmit downstream analog video traffic for broadcast to ONUs 50 in $\lambda_v$. Traffic in wavelengths $\lambda_d$ and $\lambda_v$ is combined at OLT 20 and travels over optical fiber 30 to RN 40. RN 40 splits the downstream traffic into a suitable number of copies and forwards each copy to a corresponding ONU. Each ONU receives a copy of the downstream traffic in $\lambda_d$ and $\lambda_v$ and processes the signal. Suitable addressing schemes may be used to identify which traffic is destined for which ONU 50. Each ONU 50 may also transmit upstream traffic in $\lambda_u$ along fiber 30 according to a suitable time-sharing protocol (such that upstream traffic does not collide). RN 40 receives the upstream traffic from each ONU 50 and combines the traffic from each ONU 50 into one signal. RN 40 forwards the signal over fiber 30 to OLT 20. OLT 20 receives the signal and processes it.

Although PSPONs may offer much greater bandwidth than typical access networks such as DSL networks, bandwidth requirements are projected to exceed even the increased capacity offered by typical PSPONs. For example, some streaming video and online gaming applications presently require bit rates of approximately one to ten Mb/s, and some IP high definition television and video-on-demand systems presently require bit rates of approximately twenty Mb/s. Future demands for bandwidth are projected to be even greater. Thus, a need exists for a hybrid PON (HPON) that offers a simple and efficient upgrade from existing PSPONs and that may easily and efficiently be upgraded (to, for example, a WDMPON).

Figure 2:
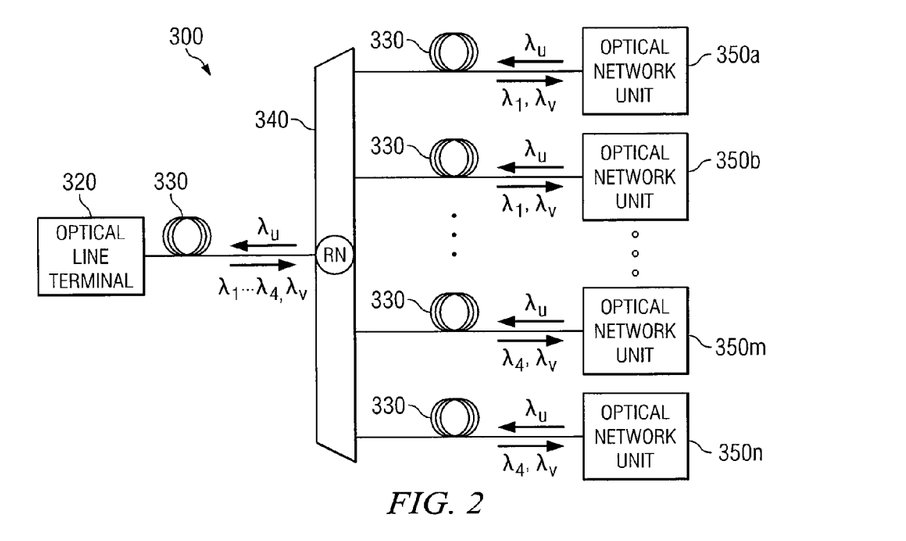
FIG. 2 is a diagram illustrating an example Hybrid PON (HPON)

FIG. 2 is a diagram illustrating an example HPON 300. Example HPON 300 comprises OLT 320, optical fiber 330, RN 340, and ONUs 350. Example HPON 300, a hybrid between a PSPON and a WDMPON, provides a cost-efficient upgrade solution for many network operators. Example HPON 300 provides greater downstream capacity cost-efficiently by having groups of two or more ONUs 350 share downstream WDM wavelengths. It should be noted that an HPON generally refers to any suitable PON that is not a full WDMPON but that is operable to route downstream traffic in particular wavelengths to particular ONUs (and to transmit upstream traffic in any suitable manner). An HPON may include both an HPON that transmits downstream traffic in a plurality of wavelengths each shared by a group of wavelength-sharing ONUs (a WS-HPON) and an HPON that transmits downstream traffic in a unique wavelength for each ONU (retaining PSPON characteristics in the upstream direction).

In the illustrated example, ONUs 350a-350n may share $\lambda_1$-$\lambda_4$. Traffic in $\lambda_v$ is broadcast to all ONUs. It should be noted that any suitable number of ONUs may be associated with one OLT. Additionally, any suitable number of ONUs may share one or more wavelengths in a WS-HPON. Using shared wavelengths in a WS-HPON permits the use of less costly optics components than in, for example, WDMPON. For example, sharing downstream wavelengths in HPON 300 reduces the cost and stability requirements of the multiplexer and transmitter/receiver components in the network. Due to the sharing of wavelengths, the spacing between WDM wavelengths may be increased to relax the specifications of wavelength selective elements and to relax the requirements for transmitter wavelength stability and temperature stability of passive components. By using less expensive components to provide a desired increase in downstream bandwidth, HPON 300 is a much more attractive upgrade solution for many network operators than WDMPON.

OLT 320 of HPON 300 (which may be an example of an upstream terminal) may reside at the carrier's central office and comprises four transmitters operable to transmit downstream traffic over $\lambda_1$-$\lambda_4$, which are to be shared by groups of ONUs 350. OLT 320 may also comprise an additional transmitter operable to transmit an analog video signal in $\lambda_v$ for broadcast to all ONUs 350. OLT 320 may also comprise a multiplexer operable to multiplex the wavelengths transmitted by the transmitters of OLT 320. OLT 320 may also comprise a receiver operable to receive upstream traffic in wavelength $\lambda_u$, which is time-shared by ONUs 350. It should be noted that although the illustrated embodiment shows only four downstream wavelengths to be shared by ONUs 350, any suitable number of downstream wavelengths may be transmitted at OLT 320 and shared by groups of ONUs 350. In addition, any suitable number of downstream wavelengths may be transmitted at OLT 320 and the traffic in these wavelengths broadcast to all ONUs 350 (and not just the traffic in $\lambda_v$, as illustrated). It should be further noted that traffic in any suitable number of upstream wavelengths may be received at OLT 320 (including traffic in multiple sub-bands of the GPON one hundred nanometer upstream band) and an upstream wavelength need not be time-shared by all ONUs (for example, a separate upstream wavelength may be time-shared by each group of downstream, wavelength-sharing ONUs).

Optical fiber 330 may comprise any suitable fiber to carry upstream and downstream traffic. In certain HPONs 300, optical fiber 330 may comprise, for example, bidirectional fiber. In other HPONs 300, optical fiber 330 may comprise two distinct fibers.

RN 340 of HPON 300 may comprise a multiplexer and a power splitter. The multiplexer is operable to demultiplex downstream wavelengths $\lambda_1$-$\lambda_4$ and forward traffic in each of these wavelengths to a corresponding group of wavelength-sharing ONUs 350. The power splitter is operable to receive and split traffic in downstream wavelength $\lambda_v$ (if applicable) for broadcast to all ONUs 350. With regard to upstream traffic, the power splitter of RN 340 is also operable to receive and combine traffic in time-shared $\lambda_u$ from ONUs 350 into one signal. RN 340 is further operable to forward the upstream signal to OLT 320. It should be noted that although RN 340 is referred to as a remote node, "remote" refers to RN 340 being communicatively coupled to OLT 320 and ONUs 350 in any suitable spatial arrangement. A remote node may also generally be referred to as a distribution node.

ONUs 350 (which may be examples of downstream terminals) may comprise any suitable optical network unit or ONT and may serve residential and/or commercial customers. There may be any suitable number of ONUs. Each ONU 350 may comprise one receiver to receive traffic over a shared wavelength, one of $\lambda_1$-$\lambda_4$, and one receiver to receive traffic over $\lambda_v$ (if applicable). Each ONU 350 may also comprise one transmitter to transmit upstream traffic over time-shared $\lambda_u$. Each ONU 350 may thus comprise a triplexer.

In operation, the transmitters in OLT 320 transmit downstream traffic over $\lambda_1$-$\lambda_4$, which are to be shared by groups of ONUs 350, and (in certain cases) one transmitter in OLT 320 transmits downstream traffic to be broadcast to all ONUs 350 over $\lambda_v$. Traffic in wavelengths $\lambda_1$-$\lambda_4$ and $\lambda_v$ is multiplexed at OLT 320 into one signal, and the signal travels over optical fiber 330 to RN 340. RN 340 filters the traffic in $\lambda_v$ out of the signal and forwards the traffic to the power splitter where it is split for broadcast to all ONUs 350. At the multiplexer, RN 340 demultiplexes the signal comprising the traffic in the remaining wavelengths ($\lambda_1$-$\lambda_4$) and forwards the traffic in each wavelength, one of $\lambda_1$-$\lambda_4$, to its corresponding group of wavelength-sharing ONUs 350. Each ONU 350 receives traffic over one or more of the wavelengths that it shares with other ONUs 350 and processes the traffic (according to a suitable protocol). Each ONU 350 may also receive and process traffic over $\lambda_v$. In the upstream direction, each ONU 350 time-shares use of $\lambda_u$ according to a suitable protocol. RN 340 receives upstream traffic carried over time-shared $\lambda_u$ from each of the ONUs 350 and combines the traffic into one signal using the power splitter. RN 340 forwards the combined signal over fiber 230 to OLT 220. OLT 220 receives the signal at its receiver and processes the traffic.

Modifications, additions, or omissions may be made to the HPON 300 described without departing from the scope of the invention. The components of the HPON 300 described may be integrated or separated according to particular needs. Moreover, the operations of the HPON 300 described may be performed by more, fewer, or other components.

Figure 3:
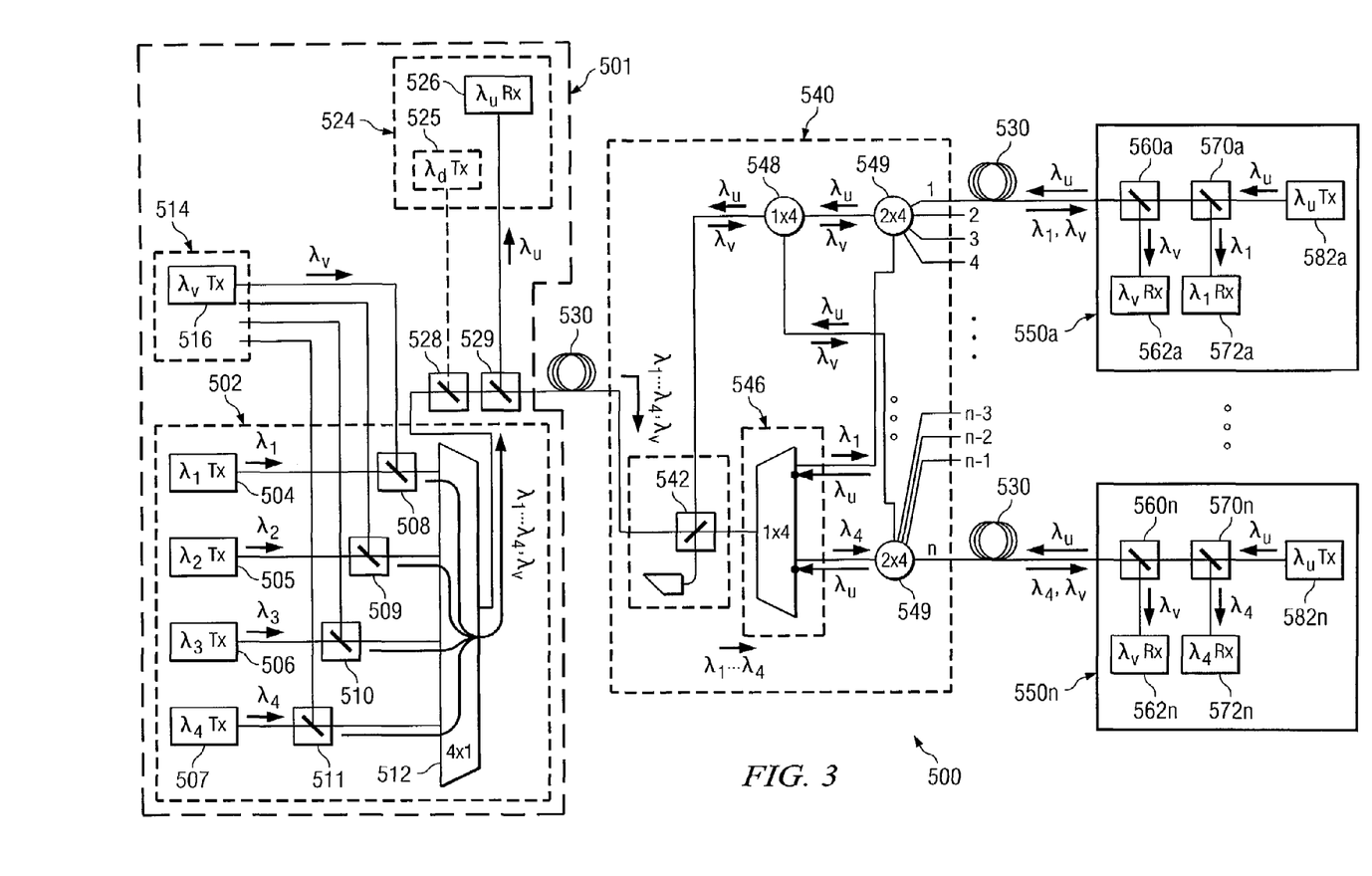
FIG. 3 is a diagram illustrating in more detail the example HPON of FIG. 2.

FIG. 3 is a diagram illustrating in more detail the example HPON of FIG. 2. HPON 500 comprises OLT 501, fiber 530, RN 540, and ONUs 550. OLT 501 (which may be an example of an upstream terminal) comprises WDM transmission section 502, upgradeable transmission section 514, PSPON transceiver 524, and filters 528 and 529. WDM transmission section 502 comprises transmitters 504-507, filters 508-511, and multiplexer 512. Each transmitter 504-507 may comprise any suitable transmitter and is operable to transmit traffic over a corresponding wavelength, $\lambda_1$-$\lambda_4$, respectively. It should be noted that although example HPON 500 does not provide WDM for upstream traffic, and thus new receivers are not needed in conjunction with new transmitters 504-507, it may be economical to implement transceivers (transmitter and receiver) in WDM transmission section 502 instead of only transmitters (in anticipation of a further upgrade to WDM upstream). The cost of transceivers is typically less than the cost of a separate transmitter and receiver, thus reducing the eventual overall cost to upgrade to a WDMPON. It should further be noted that although only four new transmitters are illustrated in example HPON 500, any suitable number of transmitters (or transceivers) may be included.

Each filter 508-511 may comprise any suitable filter and is operable to pass the traffic in $\lambda_1$-$\lambda_4$, respectively. In addition, filter 508 is operable to direct the traffic in wavelength $\lambda_v$ from transmitter 516 of upgradeable transmission section 514 to multiplexer 512 (such that the traffic in both $\lambda_1$ and $\lambda_v$ is forwarded to multiplexer 512 over the same fiber). In fact, each filter 508-511 may be coupled to upgradeable transmission section 514 (through a corresponding fiber), allowing for an easy upgrade if more transmitters are added to HPON 500. The fibers coupling filters 509-511 and upgradeable transmission section 514 do not carry a signal in the illustrated example HPON 500 of FIG. 3, as no new transmitters have been added to upgradeable transmission section 514. However, filters 509-511 may be operable to direct the traffic in the corresponding wavelengths associated with potential transmitters added to upgradeable transmission section 514. After the upgrade, filters 509-511 would direct the traffic in the corresponding wavelength from upgradeable transmission section 514 in a similar manner as filter 508 directs the traffic in $\lambda_v$.

Upgradeable transmission section 514 comprises transmitter 516 and a set of three terminating fiber leads. Transmitter 516 comprises any suitable transmitter and is operable to transmit traffic over $\lambda_v$. In particular embodiments, transmitter 516 may transmit analog video traffic over $\lambda_v$ (although transmitter 516 may alternatively transmit digital data traffic). The three terminating fiber leads may be coupled to new transmitters if new transmitters are added to upgrade example HPON 500. As discussed above, each terminating lead is coupled to a corresponding filter, one of filters 509-511. It should be noted that although only three fiber leads are illustrated, any suitable number of leads may be added in anticipation of further upgrades of HPON 500.

Multiplexer 512 comprises any suitable multiplexer/demultiplexer (and may be considered a wavelength router) and is operable to combine the traffic in $\lambda_1$-$\lambda_4$ and $\lambda_v$ into one signal. In the illustrated example 500, multiplexer 512 comprises a cyclic multiplexer operable to receive and combine the traffic in more than one wavelength through each port (such as the traffic in $\lambda_1$ and $\lambda_v$ through the first port). In other example networks, multiplexer 512 may be a typical Nx1 multiplexer operable to receive only the traffic in one wavelength through each port. Where the traffic in a large number of wavelengths is being multiplexed, a cyclic multiplexer may prove more cost-efficient than a multiplexer having N ports. Furthermore, a cyclic multiplexer may not need to be replaced to add more ports (as with typical multiplexers) if more transmitters are added to the OLT to upgrade HPON 500. For example, HPON 500 may be upgraded to transmit traffic in eight downstream wavelengths, including $\lambda_1$-$\lambda_4$ and additional wavelengths $\lambda_5$-$\lambda_8$. In such an upgrade, cyclic multiplexer 512 need not be replaced to receive the traffic in the four additional wavelengths, as the multiplexer's first port may receive the traffic in $\lambda_1$ and $\lambda_5$, the second port may receive the traffic in $\lambda_2$ and $\lambda_6$, the third port may receive the traffic in $\lambda_3$ and $\lambda_7$, and the fourth port may receive the traffic in $\lambda_4$ and $\lambda_8$. In the contrasting situation in which non-cyclic multiplexers are used, a 4×1 multiplexer would need to be replaced by an 8×1 multiplexer to receive the traffic in the four additional wavelengths.

PSPON transceiver 524 comprises transmitter 525 and receiver 526. Transmitter 525 of transceiver 524 may comprise any suitable transmitter operable to transmit traffic over wavelength $\lambda_d$. Transmitter 525 may, in particular embodiments, comprise the transmitter used in the PSPON being upgraded. In HPON 500, transmitter 525 may no longer transmit traffic over the network, and may be replaced by transmitters 504-507 of WDM transmission section 502. Transmitter 525 may, in particular embodiments, remain in place to provide limited protection for failure of the downstream WDM transmitters or to keep the network operational at lower bandwidth during particular upgrades of the network (such as, for example, an upgrade of the multiplexer in the RN). Receiver 526 of transceiver 524 may comprise any suitable receiver operable to receive upstream traffic from ONUs 550 carried over time-shared $\lambda_u$.

Filter 528 comprises any suitable filter operable to pass the traffic in $\lambda_1$-$\lambda_4$ and $\lambda_v$ to filter 529. Filter 528 may also be operable to pass the traffic in additional wavelengths to be transmitted in upgrades of HPON 500. Although illustrated in-line in HPON 500, in other example embodiments, filter 528 may be switched out of the line using a suitable switch.

Filter 529 comprises any suitable filter operable to pass the traffic in $\lambda_1$-$\lambda_4$ and $\lambda_v$ over fiber 530 to RN 540. Filter 528 may also be operable to pass traffic in additional wavelengths to be transmitted in upgrades of HPON 500. In addition, filter 529 is operable to direct traffic in upstream wavelength $\lambda_u$ to receiver 526.

Optical fiber 530 may comprise any suitable fiber to carry upstream and downstream traffic. In certain HPONs 500, optical fiber 530 may comprise, for example, bidirectional optical fiber. In other HPONs 500, optical fiber 530 may comprise two distinct fibers, one carrying downstream traffic and the other carrying upstream traffic.

RN 540 comprises filter 542, multiplexer 546, primary power splitter 548, and secondary power splitters 549. RN 540 is operable to receive the traffic in $\lambda_1$-$\lambda_4$ and $\lambda_v$ from OLT 501, filter out and broadcast the traffic in $\lambda_v$, and demultiplex and forward the traffic in $\lambda_1$-$\lambda_4$ to the ONUs in corresponding groups of wavelength-sharing ONUs 550. RN 540 is further operable to receive from ONUs 550 upstream signals carried over time-shared wavelength $\lambda_u$, combine these signals, and forward the combined traffic in $\lambda_u$ to OLT 501. To reiterate, HPON 500 is operable to allow wavelength-sharing among groups of ONUs 550, thereby increasing network capacity while avoiding the costly components of a full downstream WDM network.

Filter 542 may comprise any suitable filter operable to receive a signal comprising traffic in $\lambda_1$-$\lambda_4$ and $\lambda_v$, pass the traffic in $\lambda_1$-$\lambda_4$ to multiplexer 546, and direct the traffic in $\lambda_v$ to primary power splitter 548. Although filter 542 in the illustrated example includes only one filter, filter 542 may comprise any suitable number of filters (coupled to optional switches) to facilitate an upgrade of the network. In the upstream direction, filter 542 is operable to receive the traffic in $\lambda_u$ and direct it toward OLT 501.

Multiplexer 546 may include any suitable multiplexer/demultiplexer (and may be considered a wavelength router) and is operable to receive the signal comprising the traffic in $\lambda_1$-$\lambda_4$ and demultiplex the signal. Although in the illustrated example, multiplexer 546 is a 1×4 multiplexer, in alternative networks, multiplexer 546 may have any suitable number of ports. Also, in alternative networks, multiplexer 546 may comprise two or more separate multiplexers receiving downstream signals from one or more upstream sources and forwarding the traffic downstream such that ONUs share wavelengths. In the illustrated example network, multiplexer 546 may comprise a cyclic multiplexer (in which each port is operable to carry traffic in more than one wavelength). In the downstream direction, each output port of multiplexer 546 is operable to forward the traffic in a corresponding one of $\lambda_1$-$\lambda_4$ to a corresponding secondary power splitter 549. In alternative embodiments, the traffic in each wavelength may pass to a different secondary power splitter than that illustrated, the traffic in more than one wavelength may pass to a secondary power splitter, and/or multiplexer 546 may receive, multiplex, and pass traffic in more than four downstream wavelengths.

In the upstream direction, multiplexer 546 may be operable to receive and terminate the traffic in $\lambda_u$, as ONUs 550 of example HPON 500 time-share $\lambda_u$ (and do not transmit traffic over multiple upstream wavelengths). Alternatively, multiplexer 546 may forward this traffic to filter 542 for suitable termination (where termination may be performed internally or externally). However, if HPON 500 is upgraded to provide WDM upstream, multiplexer 546 may be operable to receive traffic in multiple upstream wavelengths from ONUs 550 and multiplex the traffic in these wavelengths, forwarding them to OLT 501.

Primary power splitter 548 may comprise any suitable power splitter operable to receive the traffic in $\lambda_v$ and split the traffic into four copies. The power of each copy may be less than one-fourth of the power of the original signal $\lambda_v$. Primary power splitter 548 is operable to forward each copy to a corresponding secondary power splitter 549. In the upstream direction, primary power splitter 548 is operable to receive traffic transmitted by ONUs 550 over time-shared $\lambda_u$ from secondary power splitters 549 and combine this traffic into one signal. Primary power splitter 548 forwards the upstream signal to OLT 501. Primary power splitter 548 thus broadcasts the traffic in $\lambda_v$ in the downstream direction and combines traffic over time-shared $\lambda_u$ in the upstream direction. Although primary power splitter 548 is illustrated as a 1×4 power splitter, any suitable power splitter may be used.

Each secondary power splitter 549 may comprise any suitable power splitter, such as an optical coupler, operable to receive a signal from primary power splitter 548 and a signal from multiplexer 546, combine the two signals into one signal, split the combined signal into a suitable number of copies, and forward each copy to the ONUs in a corresponding wavelength-sharing group of ONUs 550 (each group of wavelength-sharing ONUs shares one of $\lambda_1$-$\lambda_4$ in the downstream direction). In the upstream direction, each secondary power splitter 549 is operable to receive traffic transmitted at $\lambda_u$ from each ONU 550 of a corresponding group of ONUs 550 and combine the traffic from each ONU 550 into one signal. Each secondary power splitter 549 is operable to split the combined upstream traffic into two copies and forward one copy to primary power splitter 548 and one copy to multiplexer 546. The copy forwarded to primary power splitter 548, as described above, is combined with other traffic from other ONUs 550 transmitted over time-shared $\lambda_u$. The copy forwarded to multiplexer 546 may be blocked or forwarded to filter 542 for suitable termination. Although secondary power splitters 549 are illustrated as 2×4 couplers in example HPON 500, secondary power splitters 549 may be any suitable coupler or combination of couplers (such as a 2×2 coupler coupled to two 1×2 couplers). Secondary power splitters 549 may split or combine any suitable number of signals.

Each ONU 550 (which may be an example of a downstream terminal) may comprise any suitable ONU or ONT. ONU 550 comprises a filter 560, receiver 562, filter 570, receiver 572, and transmitter 582. Each filter 560 may comprise any suitable filter operable to direct traffic in wavelength $\lambda_v$ (for example, analog video traffic) to receiver 562. Filter 560 is further operable to pass the traffic in the corresponding one of $\lambda_1$-$\lambda_4$ received at the ONU 550 to filter 570 and to pass the traffic in $\lambda_u$ to RN 540 in the upstream direction. Receiver 562 may comprise any suitable receiver operable to receive the traffic transmitted in $\lambda_v$ and process the traffic. Each filter 570 may comprise any suitable filter operable to receive the traffic in a corresponding one of $\lambda_1$-$\lambda_4$ and direct it to receiver 572. Filter 570 is further operable to pass the traffic in upstream wavelength $\lambda_u$ to corresponding filter 560 in the upstream direction. Receiver 572 may comprise any suitable receiver operable to receive the traffic transmitted in a corresponding one of $\lambda_1$-$\lambda_4$ and process the traffic. Receiver 572 may be operable to receive traffic in any one of $\lambda_1$-$\lambda_4$, providing flexibility in assigning (or re-assigning) an ONU 550 to a particular wavelength-sharing group. Each transmitter 582 may comprise any suitable transmitter operable to transmit traffic over $\lambda_u$ in the upstream direction, applying a suitable protocol to time-share $\lambda_u$ with the other ONUs 550. It should be noted that although four ONUs are illustrated as being part of a group of ONUs in HPON 500, any suitable number of ONUs may be part of a group sharing a downstream wavelength. In addition, there may be multiple groups each sharing a different downstream wavelength (as is the case in the illustrated example). It should also be noted that any suitable number of ONUs 550 may be implemented in the network. It should further be noted that ONUs 550 may be adjusted in an alternative upgrade to transmit traffic over multiple wavelengths (which may be combined by PS 548 of RN 540) to be received by receivers corresponding to transmitters 504-507 (in which case filter 529 may or may not be taken out of the line). In an alternative upgrade, each group of ONUs sharing a wavelength may transmit upstream traffic in a separate wavelength (and multiplexer 546 may multiplex these wavelengths at the RN, and receivers 504-507 may receive these wavelengths).

In operation, transmitters 504-507 and (analog video) transmitter 516 of OLT 501 transmit traffic over $\lambda_1$-$\lambda_4$ and $\lambda_v$, respectively. Filters 508-511 receive the traffic in $\lambda_1$-$\lambda_4$, respectively, and pass the signals. Filter 508 also receives and directs the traffic in $\lambda_v$, combining it with the traffic in $\lambda_1$. As discussed above, HPON 500 is configured to be easily upgraded to include additional transmitters at upgradeable transmission section 514 of OLT 501. After receiving the traffic in their corresponding wavelengths, filters 508-511 forward the corresponding signals to multiplexer 512. Multiplexer 512, which may include, for example, a cyclic multiplexer, combines the traffic in the five wavelengths into one signal and forwards the signal to filter 528. As discussed above, filter 528 may be in-line or may be switched out of the line, in which case the downstream signal would pass directly to filter 529. If filter 528 remains in-line, filter 528 receives the downstream signal and allows the signal to pass to filter 529. Filter 529 receives the signal and allows the signal to pass, forwarding the signal over optical fiber 530 to RN 540.

Filter 542 of RN 540 receives the signal and directs the traffic in (e.g., analog video) wavelength $\lambda_v$ to primary power splitter 548, allowing the traffic in $\lambda_1$-$\lambda_4$ to pass to multiplexer 546. Primary power splitter 548 receives the traffic in $\lambda_v$ and splits it into a suitable number of copies. In the illustrated embodiment, primary power splitter 548 splits the traffic in $\lambda_v$ into four copies, and forwards each copy to a corresponding secondary power splitter 549. Multiplexer 546 receives the signal comprising the traffic in $\lambda_1$-$\lambda_4$ and demultiplexes the signal into its constituent wavelengths. Multiplexer 546 then forwards the traffic in each wavelength along a corresponding fiber such that each secondary power splitter 549 receives the traffic in a corresponding one of $\lambda_1$-$\lambda_4$. Each secondary power splitter 549 thus receives traffic in a corresponding one of $\lambda_1$-$\lambda_4$ from multiplexer 546 and a copy of traffic in $\lambda_v$ from primary power splitter 548, combines the two wavelengths into one signal, and splits the signal into a suitable number of copies. In the illustrated embodiment, each secondary power splitter 549 splits the signal into four copies. In this way, the traffic (e.g., analog video) in wavelength $\lambda_v$ is broadcast to all ONUs 550 and a corresponding one of $\lambda_1$-$\lambda_4$ is transmitted to and shared by one or more groups of ONUs 550. It should be noted again that the groups of ONUs sharing a wavelength may be different than those illustrated in FIG. 3, and groups of wavelength-sharing ONUs may share more than one WDM wavelength in alternative networks.

After secondary power splitters 549 split the signal comprising the traffic in a corresponding one of $\lambda_1$-$\lambda_4$ and the traffic in $\lambda_v$ into four copies, secondary power splitters 549 forward each copy over fiber 530 such that the ONUs 550 coupled to the secondary power splitter 549 receive a copy. Filter 560 of each ONU 550 receives the signal and directs the traffic in $\lambda_v$ to receiver 562, which then processes the traffic carried over $\lambda_v$. Filter 560 passes the corresponding one of $\lambda_1$-$\lambda_4$ to filter 570. Filter 570 receives the traffic in the corresponding one of $\lambda_1$-$\lambda_4$ and directs the traffic to receiver 572 which then processes the traffic. Again, since each ONU 550 in a group may share one of $\lambda_1$-$\lambda_4$ with other ONUs 550 in the group, ONUs 550 may apply a suitable addressing protocol to process downstream traffic appropriately (i.e., to determine which portion of the traffic transmitted in the corresponding wavelength is destined for which ONU 550 in a group).

In the upstream direction, transmitter 582 of each ONU 550 transmits traffic over $\lambda_u$. Filters 570 and 560 receive the traffic in $\lambda_u$ and pass the traffic. The signal travels over fiber 530 to RN 540. Each secondary power splitter 549 of RN 540 receives traffic over time-shared $\lambda_u$ and combines the traffic from each ONU 550 in the corresponding group of ONUs 550. Again, since each ONU 550 transmits traffic over upstream wavelength $\lambda_u$, ONUs 550 may adhere to a suitable protocol to time-share $\lambda_u$ such that traffic from multiple ONUs does not collide. After receiving and combining traffic over $\lambda_u$ into one signal, each secondary power splitter 549 splits the signal into two copies, forwarding one copy to multiplexer 546 and one copy to primary power splitter 548. As discussed above, multiplexer 546 of example network 500 may block $\lambda_u$ or forward $\lambda_u$ to filter 542 for suitable termination (internal or external to filter 542). Primary power splitter 548 receives traffic over $\lambda_u$ from each secondary power splitter 549, combines the traffic, and forwards the traffic to filter 542. Filter 542 receives the combined traffic in $\lambda_u$ and directs the traffic toward OLT 501. Fiber 530 carries the traffic in $\lambda_u$ to filter 529 of OLT 501. Filter 529 receives the traffic in $\lambda_u$ and directs the traffic toward receiver 526. Receiver 526 receives the traffic and processes it.

Modifications, additions, or omissions may be made to the example HPON 500 described without departing from the scope of the invention. The components of the example HPON 500 described may be integrated or separated according to particular needs. Moreover, the operations of the example HPON 500 described may be performed by more, fewer, or other components. As examples only, alternative networks may comprise redundant lines from the OLT suitably coupled to the RN, the RN may provide any suitable number of outputs to the ONUs, and any suitable number of wavelength routers may be added to the RN (making suitable changes to the network).

In upgrading from a PSPON to an HPON, network operators may be required to upgrade the PSPON messaging scheme due to the upgraded HPON architecture. For example, unlike in a PSPON, in an example HPON, the OLT assigns particular downstream wavelengths to one or more ONUs, but receives upstream traffic from all of the ONUs in a single wavelength. Under such conditions, the PSPON messaging scheme may not be operable to enable auto-discovery of ONU reachability, as discussed further below. Thus, an upgrade from a PSPON messaging scheme may be required.

In upgrading from a PSPON messaging scheme, network operators may also desire an efficient solution. An efficient messaging scheme may be one, for example, that does not substantially deviate from the PSPON messaging scheme being upgraded, thereby reducing software and/or hardware modifications. An efficient messaging scheme may also be one that does not require substantial changes to network components. As an example only, in an upgrade from GPON to HGPON, an efficient scheme for auto-discovery of ONU reachability may be one that does not substantially deviate from the G.984.3 GPON protocol and/or one that does not require changes to ONU hardware. Analogous auto-discovery schemes may also be efficient in other PSPON upgrade contexts, such as, for example, in upgrades from BPONs or GEPONs.

Typically, ONUs in a GPON are installed and activated according to a GPON protocol known as the ITU-T G.984.3 protocol. The protocol provides for the automatic discovery and ranging of ONUs in the network and for ONU management and control channel (OMCC) setup using physical layer operations, administration, and maintenance (PLOAM) messaging. Specifically, to activate a newly connected ONU under the protocol, the OLT discovers the serial number of the newly connected ONU. The OLT does so by transmitting an ONU serial number request message to all of the downstream ONUs. The newly connected ONU responds to the OLT message by reporting its serial number to the OLT.

After discovering the serial numbers of the newly connected ONU, the OLT assigns an ONU-ID to the ONU, measures the arrival phase of upstream transmission from the ONU, notifies the ONU of the equalization delay (allowing the ONU to adjust upstream transmission with the notified delay value), and configures the OMCC to each ONU using the "Configure Port-ID" PLOAM message. Because the ITU-T G.984.3 protocol cannot, without modification, enable the use of multiple downstream WDM wavelengths and the association of particular subsets of ONUs with particular downstream wavelengths, the unmodified protocol cannot be used in an HGPON to route downstream traffic to the appropriate ONU. Thus, a different messaging scheme is needed to install and activate ONUs in an HGPON.

To install and activate ONUs efficiently in an HPON, in particular embodiments, a messaging scheme may be used that associates, at the OLT, particular transmitted wavelengths with the one or more ONUs receiving traffic in the particular wavelengths. Generally, such associations may be initially established using either a sequential auto-discovery of reachability scheme or a simultaneous auto-discovery of reachability scheme. A sequential auto-discovery scheme generally refers to the OLT automatically discovering, in sequence for each downstream WDM wavelength, each set of one or more ONUs sharing a particular downstream wavelength. In particular embodiments, discovery may be initiated for one downstream wavelength at a time. A simultaneous auto-discovery scheme generally refers to the OLT automatically discovering, in parallel for all downstream WDM wavelengths, the set of one or more ONUs sharing each downstream wavelength. In either case, in the HGPON context, only minor changes are made to the ITU-T G.984.3 protocol and/or to existing network components in particular embodiments, thereby providing an efficient solution. Each of these auto-discovery schemes is discussed further below.

Figure 4:
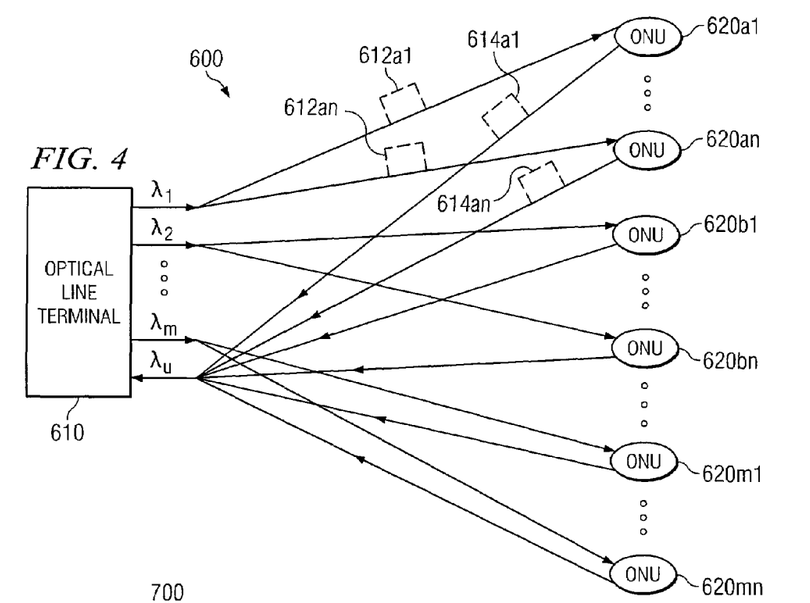
FIG. 4 is a diagram illustrating an auto-discovery of reachability scheme in an example HPON logical topology according to a particular embodiment of the invention.

FIG. 4 is a diagram illustrating an auto-discovery of reachability scheme in an example HPON logical topology 600 according to a particular embodiment of the invention. Topology 600 comprises OLT 610 and ONUs 620. In particular embodiments, OLT 610 and ONUs 620 may be the same as OLT 501 and ONUs 550, respectively, and thus will not be described again in detail. As can be observed, in the downstream direction, wavelengths transmitted by OLT 610 ($\lambda_1$-$\lambda_m$) are shared by particular groups of ONUs 620. In the upstream direction, ONUs 620 time-share transmission at $\lambda_u$.

The scheme of FIG. 4 is an example of a sequential auto-discovery scheme. Each group of wavelength-sharing ONUs 620 is discovered serially by initiating discovery for one downstream wavelength at a time. Each downstream wavelength may correspond to a particular transmitter interface in particular embodiments. Initiating discovery from a single transmitter interface at a time may require synchronization among OLT transmitters in particular embodiments and thus minor modifications to the OLT may be needed to provide for synchronization control of the transmitters in this manner. However, using a sequential auto-discovery of reachability scheme may require no modification of the ITU-T G.984.3 message formats in particular embodiments.

In operation, to initiate discovery, OLT 610 transmits a downstream configuration message 612a (e.g., an ONU serial number request message such as a "SN-RQ-All" message with alloc-ID=254) at a first wavelength (e.g., $\lambda_1$) to a first set of one or more ONUs 620 (e.g., ONUs 620a). In particular embodiments, message 612a may be the same as the serial number request message used in the G.984.3 protocol. To avoid any collisions due to simultaneous responses from ONUs 620 in the upstream direction, in particular embodiments, OLT 610 transmits a configuration message with alloc-ID=255 or with no bandwidth allocation for upstream transmission (e.g., ZeroPointers) at the other downstream WDM wavelengths. The ONUs 620 receiving traffic in the first wavelength (e.g., ONUs 620a) respond to the request by reporting their serial numbers to OLT 610 in configuration messages 614a (e.g., "SN-ONU" messages). In particular embodiments, messages 614a may be the same as the serial number response messages used in the G.984.3 protocol. OLT 610 may then assign an ONU-ID to each reporting ONU 620 in particular embodiments. An ONU-ID may be used, for example, as an ONU identifier in messaging for control and management.

Using serial number discovery, OLT 610 associates the first set of ONUs 620a with the first downstream wavelength. Since each downstream wavelength may correspond to a particular transmitter interface in particular embodiments, OLT 610 may associate the first set of ONUs 620a with a first transmitter interface transmitting at the first wavelength. In such embodiments, OLT 610 may build and maintain a reachability table between ONU-ID and transmitter interface number (TXIF#) to associate the first set of ONUs 620a with this first transmitter interface. An example reachability table is described below in conjunction with FIG. 5.

After OLT 610 concludes serial number discovery associated with the first wavelength, OLT 610 initiates serial number discovery associated with a second wavelength. OLT 610 does so by transmitting a configuration message (e.g., an ONU serial number request message such as a "SN-RQ-All" message with alloc-ID=254) at a second wavelength (e.g., $\lambda_2$) to a second set of one or more ONUs 620 (e.g., ONUs 620b). In particular embodiments, the message may be the same as the serial number request message used in the G.984.3 protocol. To avoid any collisions due to simultaneous responses from ONUs 620 in the upstream direction, in particular embodiments, OLT 610 transmits a configuration message with alloc-ID=255 or with no bandwidth allocation for upstream transmission (e.g., ZeroPointers) at the other downstream WDM wavelengths. The ONUs 620 receiving traffic in the second wavelength (e.g., ONUs 620b) respond to the request by reporting their serial numbers to OLT 610 in suitable configuration messages (e.g., "SN-ONU" messages). In particular embodiments, these messages may be the same as the serial number response messages used in the G.984.3 protocol. OLT 610 may then assign an ONU-ID to each reporting ONU 620 in particular embodiments.

Using serial number discovery, OLT 610 associates the second set of ONUs 620b with the second downstream WDM wavelength. Since each downstream wavelength may correspond to a particular transmitter interface in particular embodiments, OLT 610 may associate the second set of ONUs 620b with a second transmitter interface transmitting at the second wavelength. In such embodiments, OLT 610 may associate the second set of ONUs 620b with this second transmitter interface in the reachability table.

Serial number discovery may be performed sequentially for each additional wavelength transmitted at OLT 610. Using the sequential auto-discovery scheme described, OLT 610 may associate each set of ONUs 610 with a particular wavelength in the reachability table. In this way, ONUs may be automatically installed and activated in the HPON. In addition, because no modification of the ITU-T G.984.3 message formats may be required in particular embodiments, the sequential auto-discovery scheme may provide an efficient solution.

It should be noted that, although particular embodiments are described in conjunction with an upgrade from the GPON system architecture and messaging protocol, alternative embodiments may be associated with upgrades from other PSPON systems having similar architectures and messaging protocols, such as BPON and GEPON systems. It should further be noted that the sequential auto-discovery scheme described above may be performed at any suitable time, such as, for example, at the first installation of one or more ONUs, in conjunction with network recovery, periodically (e.g., after a certain amount of time has passed, which may be provisionable) and/or after manual initiation by a network operator.

Figure 5:
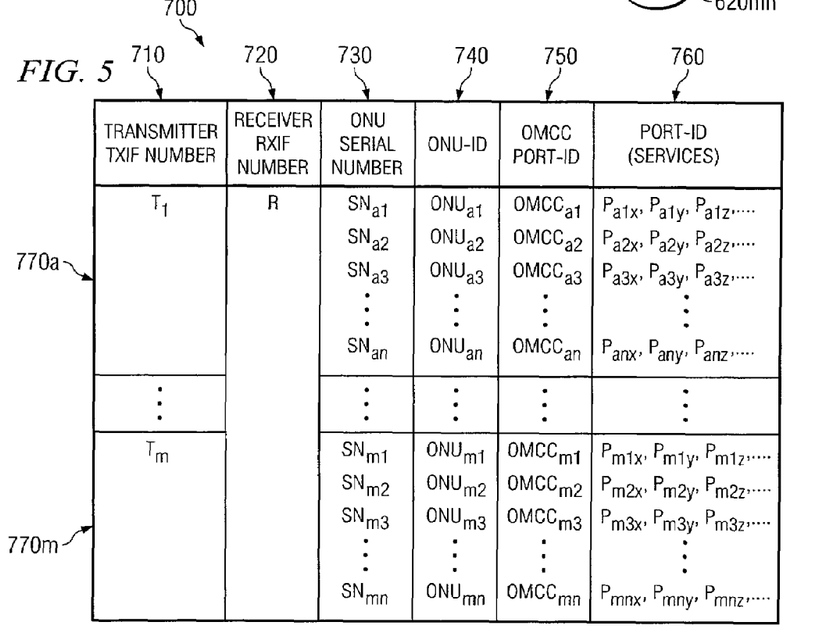
FIG. 5 is a diagram illustrating an example reachability table associated with the auto-discovery of reachability scheme of FIG. 4.

FIG. 5 is a diagram illustrating an example reachability table 700 associated with the auto-discovery of reachability scheme of FIG. 4. Reachability table 700 may, for example, be maintained and/or accessed by an OLT in an HPON to route downstream traffic to the appropriate ONU. Column 710 includes transmitter interface numbers (TXIF#s) associated with transmitter interfaces at the OLT. In the illustrated embodiment, it is assumed that each transmitter interface in the OLT is associated with only one wavelength. In alternative embodiments, transmitted downstream wavelengths corresponding to sets of ONUs may be identified in any other suitable manner. In particular embodiments, entries in column 710 may be entered manually by an operator. In alternative embodiments, entries in column 710 may be automatically discovered.

Column 720 includes receiver interface numbers (RXIF#s) associated with receivers at the OLT. In a typical example HPON where the OLT includes only one receiver, column 720 includes only the receiver interface number associated with the one receiver. However, any suitable number of receiver interface numbers corresponding to the number of receivers in the OLT may be included in column 720.

Column 730 includes ONU serial numbers associated with ONUs in the HPON. As described further below, for each transmitter interface, table 700 includes in the row 770 associated with the transmitter interface the set of ONU serial numbers corresponding to the ONUs to which the transmitter interface is to send traffic in a particular wavelength. The set of ONU serial numbers may include one or more serial numbers for each transmitter interface. In particular embodiments, entries in column 730 may be discovered using the auto-discovery scheme of FIG. 4 (described above) or FIG. 6 (described below).

Column 740 includes ONU-ID numbers associated with ONUs in the HPON. As described above, the OLT may assign in any suitable manner particular ONU-ID numbers to those ONUs responding with their serial numbers. Thus, the OLT may associate, for example, a particular ONU-ID number with a particular ONU serial number during discovery. As with serial numbers, for each transmitter interface, table 700 includes in the row 770 associated with the transmitter interface the set of ONU-ID numbers corresponding to the ONUs receiving traffic from the transmitter interface.

Column 750 includes OMCC Port-ID numbers associated with ONUs in the HPON. As discussed above, OMCC refers to an ONU management and control channel. In the illustrated embodiment, one such channel is set up for each ONU, and control and management messaging between the OLT and the ONU is communicated through the channel. This channel is identified using this OMCC Port-ID. Column 760 includes Port-ID services associated with particular Port-IDs. In particular embodiments, one or more services may correspond to a particular Port-ID. As examples only, these services may include voice over internet protocol (VOIP), internet protocol television (IPTV), and/or high speed internet access.

Thus, each row 770 corresponds to a particular transmitter interface number and associates a receiver interface number, one or more ONU serial numbers, one or more ONU-ID numbers, one or more OMCC Port-ID numbers, and one or more Port-ID services to the particular transmitter interface number. By associating sets of one or more ONUs to particular wavelengths transmitted at the OLT, table 700 may be used to route downstream traffic to the appropriate ONUs.

Modifications, additions, or omissions may be made to the example systems and methods described without departing from the scope of the invention. The components of the example methods and systems described may be integrated or separated according to particular needs. Moreover, the operations of the example methods and systems described may be performed by more, fewer, or other components.

Figure 6:
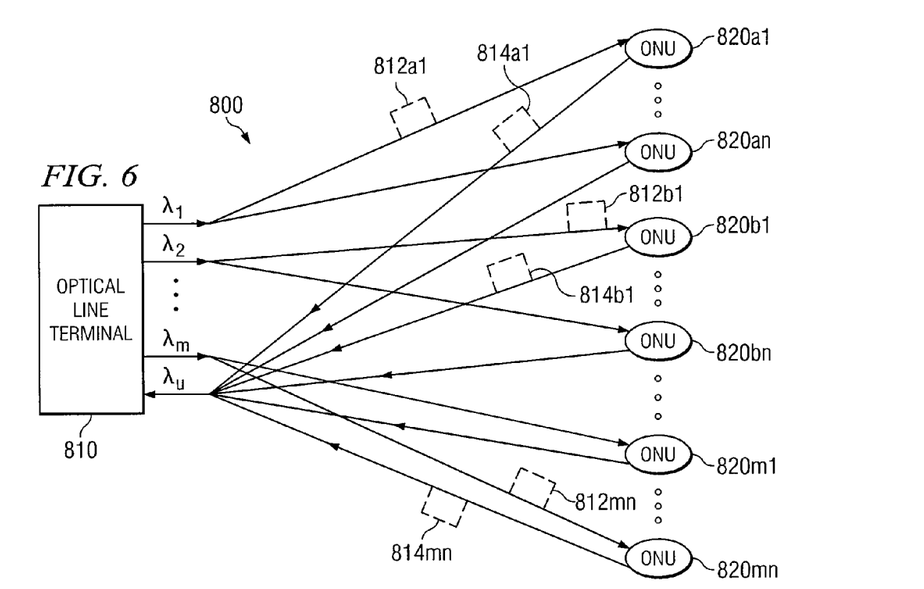
FIG. 6 is a diagram illustrating another auto-discovery of reachability scheme in an example HPON logical topology according to a particular embodiment of the invention.

FIG. 6 is a diagram illustrating another auto-discovery of reachability scheme in an example HPON logical topology 800 according to a particular embodiment of the invention. Topology 800 comprises OLT 810 and ONUs 820. In particular embodiments, OLT 810 and ONUs 820 may be the same as OLT 501 and ONUs 550, respectively, and thus will not be described again in detail. As can be observed, in the downstream direction, wavelengths transmitted by OLT 810 ($\lambda_1$-$\lambda_m$) are shared by particular groups of ONUs 820. In the upstream direction, ONUs 820 time-share transmission at $\lambda_u$.

The scheme of FIG. 6 is an example of a simultaneous auto-discovery scheme. As in a sequential auto-discovery scheme, the OLT 810 in a simultaneous auto-discovery scheme associates particular downstream wavelengths with the one or more ONUs 820 that are to receive traffic in each of the wavelengths. Unlike in a sequential auto-discovery scheme, however, each group of wavelength-sharing ONUs 820 is discovered in parallel by initiating discovery for all wavelengths concurrently.

An advantage of concurrent discovery is decreased time to complete ONU initialization. However, concurrent discovery may require minor modifications to the ITU-T G.984.3 protocol in particular embodiments. These modifications may include tagging particular upstream and downstream physical layer overhead messages with transmitter interface numbers. Such tagging may allow the OLT receiver to suitably identify the ONUs 820 associated with each transmitter interface transmitting at a particular downstream wavelength. By requiring minor modifications to the ITU-T G.984.3 protocol, such tagging may require modifications to OLT and/or ONU firmware and software in particular embodiments.

In particular embodiments, the physical layer overhead messages may be tagged with the transmitter interface number during discovery. For example, downstream configuration messages 812 (e.g., discovery messages such as serial number requests concurrently transmitted by the OLT's transmitter interfaces) may be tagged with a transmitter interface number (TXIF#) by OLT 810. ONUs 820 may respond by reporting their serial numbers to OLT 810 in an upstream configuration message 814 (e.g., in the "SN-ONU" message) and include the received TXIF# in the upstream configuration message 814. In particular embodiments, a new PLOAM messaging structure could be defined for the OLT serial number request and for the ONU serial number response to explicitly add the TXIF#. In alternative embodiments, existing fields in the OLT serial number request and ONU serial number response could be used to transmit the TXIF#. For example, in particular embodiments, the "IDENT" attribute field in the downstream configuration message and the "IND" attribute field in the upstream configuration message may be used to carry the TXIF#. In alternative embodiments, any suitable field may be used to carry the TXIF#. To maintain backwards compatibility, these attributes may be reconfigurable to follow the ITU-T G.984.3 protocol in particular embodiments.

After receiving the ONU configuration response messages 814 that include the TXIF# received at each of the ONUs 820, OLT 810 may assign an ONU-ID to each responding ONU 820 and may maintain a reachability table associating ONUs 820 (e.g., through ONU-IDs) with the transmitter interface that transmitted the wavelength(s) received by each ONU 820. Thus, for example, ONUs 820a may be associated in the reachability table with $\lambda_1$, ONUs 820b may be associated in the reachability table with $\lambda_2$, and ONUs 820m may be associated in the reachability table with $\lambda_m$. Since each transmitter interface in OLT 810 is associated with a corresponding wavelength in particular embodiments, OLT 810 may associate ONUs 820 in the reachability table with transmitter interfaces (e.g., through TXIF#'s). It should be noted that reachability table 700, described above in conjunction with FIG. 5, may be an example of a reachability table maintained by OLT 810, and thus, will not be described again.

Tagging during discovery, as described above, may associate particular TXIF#'s with particular sets of one or more ONUs. However, such tagging may require modifications to both the OLT and ONU software (and/or firmware) since the G.984.3 protocol does not prescribe such tagging. For example, the OLT may be required to tag a downstream configuration message with a TXIF#, and ONUs may be required to tag a configuration response message with the received TXIF#. As described below, if the OLT transmits the TXIF# in an unused configuration message field that the ONUs acknowledge by copying the first nine bytes of the incoming message under the G.984.3 protocol, no modifications to ONU software may be necessary (although modifications to OLT software may still be necessary). Such embodiments may provide for a more efficient simultaneous auto-discovery scheme in particular circumstances.

In particular embodiments, the transmitter interfaces at OLT 810 may perform ONU serial number discovery and ranging concurrently for all ONUs 820 without modifications to the ITU-T G.984.3 configuration messages. During discovery, OLT 810 may receive ONU serial numbers and assign ONU-IDs to these serial numbers. After discovery is completed according to the G.984.3 protocol procedures, OLT 810 may associate downstream wavelengths with ONUs 820. OLT 810 may do so by including transmitter interface numbers (TXIF#'s) in particular downstream configuration messages 812 sent after discovery. In particular embodiments, each ONU 820 may include its assigned ONU-ID and a copy of the first nine bytes of the incoming configuration message (including the TXIF#) in a configuration response message (e.g., an acknowledge message). After receiving a configuration response message 814 from each ONU 820, OLT 810 may associate particular downstream wavelengths with particular ONUs 820.

As an example only, in particular embodiments, OLT 810 may tag with TXIF#'s the "Configure Port-ID" PLOAM messages used to configure OMCC after discovery. The TXIF#'s may occupy, for example, unused bits in the "Configure Port-ID" messages (as defined by the ITU-T G.984.3 protocol). After receiving a corresponding "Configure Port-ID" message, each ONU 820 may include its assigned ONU-ID and a copy of the first nine bytes of the incoming "Configure Port-ID" message in an acknowledge message. After receiving an acknowledge message from an ONU 820, OLT 810 may associate a particular downstream wavelength (corresponding to the TXIF# received and reflected by the ONU 820) with the ONU 820.

After receiving upstream configuration messages 814 (e.g., acknowledge messages) from all of the ONUs 820, OLT 810 may maintain a reachability table associating ONUs 820 (e.g., through ONU-IDs) with the downstream wavelength(s) (e.g., through TXIF#'s) received by the ONUs 820. Thus, for example, ONUs 820a may be associated in the reachability table with $\lambda_1$, ONUs 820b may be associated in the reachability table with $\lambda_2$, and ONUs 820m may be associated in the reachability table with $\lambda_m$.

It should be noted that reachability table 700, described above in conjunction with FIG. 5, may be an example of a reachability table maintained by OLT 810, and thus, will not be described again. It should also be noted that, since, in particular embodiments, unused bits in the "Configure Port-ID" and ONU acknowledge messages are used in the upgrade, backwards compatibility to GPON is ensured in those embodiments. In addition, no change in the physical layer overhead structure (e.g., "IDENT" and "IND") and no firmware or software upgrade at ONUs 820 is required in particular embodiments.

It should further be noted that any suitable field in any suitable configuration message may be used to carry a wavelength identifier (e.g., a TXIF#). In addition, any suitable identifier of a downstream WDM wavelength (e.g., a TXIF#) may be used. Also, any suitable identifier of an ONU (e.g., an ONU serial number or ONU-ID) may be used. It should further be noted that, although particular embodiments are described in conjunction with an upgrade from the GPON system architecture and messaging protocol, alternative embodiments may be associated with upgrades from other PSPON systems having similar architectures and messaging protocols, such as, for example, BPON and GEPON systems.

Modifications, additions, or omissions may be made to the example systems and methods described without departing from the scope of the invention. The components of the example methods and systems described may be integrated or separated according to particular needs. Moreover, the operations of the example methods and systems described may be performed by more, fewer, or other components.

Figure 7:
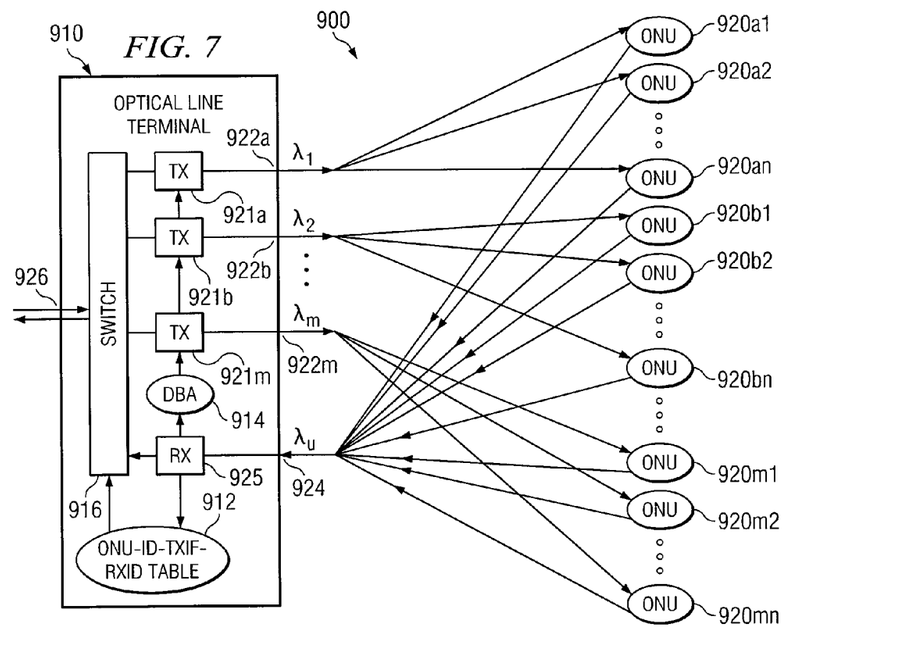
FIG. 7 is a diagram illustrating an example OLT in an example HPON logical topology according to a particular embodiment of the invention.

FIG. 7 is a diagram illustrating an example OLT 910 in an example HPON logical topology 900 according to a particular embodiment of the invention. Topology 900 comprises OLT 910 and ONUs 920. In particular embodiments, OLT 910 and ONUs 920 may be the same as OLT 501 and ONUs 550, respectively, and thus will not be described again in detail. As described further below, HPON logical topology 900 may allow for an efficient upgrade from a PSPON to an HPON. Topology 900 may do so by efficiently associating particular ONUs 920 with particular transmitter interfaces 922 in a reachability table 912 in OLT 910. Topology 900 may use the reachability table 912 (and switch 916) to forward downstream traffic to an appropriate ONU 920 (through a corresponding transmitter interface 922).

In topology 900, OLT 910 comprises a reachability table 912, a dynamic bandwidth allocation (DBA) engine 914, a switch 916, transmitters 921 and transmitter interfaces 922, receiver interface 924 and receiver 925, and a system port 926. In particular embodiments, transmitters 921 and receiver 925 may be the same as transmitters 504-507 and receiver 526, respectively, described above. Thus, transmitters 921 and receiver 925 will not be described again in detail. Transmitter interfaces 922 are configured to interface between transmitters 921 and ONUs 920. Transmitter interfaces 922 are also synchronized to coordinate communication of discovery and/or control messages to ONUs 920. Receiver interface 925 is configured to interface between ONUs 920 and receiver 925, and system port 926 is configured to forward network traffic downstream to switch 916 and to receive upstream traffic from switch 916 to communicate over the network.

Reachability table 912 may comprise any suitable reachability table, such as, for example, reachability table 700 described above in conjunction with FIG. 5. Reachability table 912 is operable to associate particular transmitter interfaces (i.e., downstream WDM wavelengths) with particular downstream ONUs (using, e.g., ONU-IDs), as may be required in an upgrade to HPON. Reachability table 912 may be built and maintained in any suitable manner, such as, for example, at OLT 910 as described above in conjunction with FIGS. 4 and 6.

DBA engine 914 may comprise any suitable component operable to generate and broadcast a bandwidth allocation map to all of the transmitters 921 (and, thus, to all of the transmitter interfaces 922). The bandwidth allocation map may be used to allocate time slots to ONUs 920 for upstream transmission. Since all ONUs 920 share wavelength $\lambda_u$ for upstream transmission, a single bandwidth allocation map may be sent across all of the transmitter interfaces 922. The physical layer overhead structure includes the configuration message and the bandwidth allocation map.

Switch 916 may comprise any suitable component operable to route incoming network traffic in the downstream direction to an appropriate transmitter 921 (and thus, to an appropriate TXIF 922 and ultimately to an appropriate ONU 920). Switch 916 may route downstream traffic to an appropriate transmitter 921 based on the traffic identifiers (e.g., virtual local area network (VLAN) or Ethernet Media Access Control (MAC) address) and based on the ONU-ID—TXIF associations in reachability table 912. For example, after receiving downstream traffic from system port 926, switch 916 may use the associated traffic identifiers to determine the ONU 920 to which the traffic is to be communicated. Based on reachability table 912, switch 916 may forward the traffic to the transmitter interface 922 corresponding to the ONU 920. Optionally, upstream bursts may be switched to corresponding system ports (not illustrated) based on ONU-ID, if multiple ports to the Ethernet switch are used.

In operation of an HPON, reachability table 912 may be built and maintained during an initialization phase as described above in conjunction with any of FIGS. 4, 5, and 6. System port 926 receives incoming network traffic in the downstream direction and forwards the traffic to switch 916. Switch 916 routes the incoming network traffic in the downstream direction to an appropriate transmitter 921 based on the associated traffic identifiers and on reachability table 912. For example, after receiving downstream traffic from system port 926, switch 916 uses the associated traffic identifiers to determine the ONU 920 to which the traffic is to be communicated. Based on reachability table 912, switch 916 forwards the traffic to the transmitter interface 922 corresponding to the ONU 920. Traffic is then communicated to the appropriate ONU 920.

In the upstream direction, ONUs 920 transmit traffic at $\lambda_u$ according to the bandwidth allocation map broadcast by DBA engine 914. Upstream bursts received at receiver 925 through receiver interface 924 are communicated to switch 916. In particular embodiments, switch 916 forwards these upstream bursts to the network through system port 926. In alternative embodiments, switch 916 forwards these upstream bursts to the network through corresponding system ports (not illustrated).

Modifications, additions, or omissions may be made to the example systems and methods described without departing from the scope of the invention. The components of the example methods and systems described may be integrated or separated according to particular needs. Moreover, the operations of the example methods and systems described may be performed by more, fewer, or other components.

Although the present invention has been described with several embodiments, various changes and modifications may be suggested to one skilled in the art. It is intended that the present invention encompass such changes and modifications as fall within the scope of the appended claims.

What is claimed is:

1. A method for managing network components in a passive optical network (PON), comprising:
   transmitting, at a first wavelength, a first configuration message on the PON;
   receiving at a receiver a configuration response message from each of one or more optical network units (ONUs) in a first set of ONUs;
   based on the configuration response messages from the first set of ONUs, associating, in a database, each ONU in the first set of ONUs with the first wavelength;
   after transmitting the first configuration message, transmitting, at a second wavelength, a second configuration message on the PON;
   during transmission of the first configuration message, transmitting a configuration message comprising no bandwidth allocation for upstream transmission at the second wavelength;
   receiving at the receiver a configuration response message from each of one or more ONUs in a second set of ONUs, wherein the ONUs in the second set of ONUs do not belong to the first set of ONUs;
   based on the configuration response messages from the second set of ONUs, associating, in the database, each ONU in the second set of ONUs with the second wavelength; and
   using the database:
      transmitting downstream traffic destined for any ONU in the first set of ONUs at the first wavelength; and
      transmitting downstream traffic destined for any ONU in the second set of ONUs at the second wavelength.

2. The method of claim 1, wherein the first configuration message and the second configuration message comprise ONU serial number requests, and the configuration response messages received from the ONUs comprise ONU serial numbers.

3. The method of claim 1, wherein the first configuration message and the second configuration message comprise the same information.

4. The method of claim 1, wherein, during transmission of the second configuration message, a configuration message comprising no bandwidth allocation for upstream transmission is transmitted at the first wavelength.

5. The method of claim 1, wherein:
   each ONU in the first set of ONUs is associated in the database with the first wavelength by associating each ONU in the first set of ONUs with a first transmitter interface transmitting at the first wavelength; and
   each ONU in the second set of ONUs is associated in the database with the second wavelength by associating each ONU in the second set of ONUs with a second transmitter interface transmitting at the second wavelength.

6. An optical line terminal (OLT) for managing network components in a passive optical network (PON), comprising:
   a first transmitter interface configured to transmit a first configuration message on the PON;
   a receiver configured to:

receive a configuration response message from each of one or more optical network units (ONUs) in a first set of ONUs; and based on the configuration response messages from the first set of ONUs, associate, in a database, each ONU in the first set of ONUs with the first transmitter interface; and a second transmitter interface configured to transmit a second configuration message on the PON after the first transmitter interface transmits the first configuration message;

wherein, during transmission of the first configuration message, the second transmitter is configured to transmit a configuration message comprising no bandwidth allocation for upstream transmission;

wherein the receiver is further configured to:

receive a configuration response message from each of one or more ONUs in a second set of ONUs, wherein the ONUs in the second set of ONUs do not belong to the first set of ONUs; and based on the configuration response messages from the second set of ONUs, associate, in the database, each ONU in the second set of ONUs with the second transmitter interface;

wherein the first transmitter interface is further configured to, using the database, transmit downstream traffic destined for any ONU in the first set of ONUs; and wherein the second transmitter interface is further configured to, using the database, transmit downstream traffic destined for any ONU in the second set of ONUs.

7. The OLT of claim 6, wherein the first configuration message and the second configuration message comprise ONU serial number requests, and the configuration response messages received from the ONUs comprise ONU serial numbers.

8. The OLT of claim 6, wherein the first configuration message and the second configuration message comprise the same information.

9. The OLT of claim 6, wherein, during transmission of the second configuration message, the first transmitter is configured to transmit a configuration message comprising no bandwidth allocation for upstream transmission.

10. A method for managing network components in a passive optical network (PON), comprising:

transmitting, at a first wavelength, a first configuration message on the PON, wherein the first configuration message comprises a first transmitter interface number;

transmitting, at a second wavelength and at approximately the same time as the first configuration message, a second configuration message on the PON, wherein the second configuration message comprises a second transmitter interface number;

receiving at a receiver a configuration response message from each of one or more optical network units (ONUs) in a first set of ONUs that comprises the first transmitter interface number;

receiving at the receiver a configuration response message from each of one or more ONUs in a second set of ONUs that comprises the second transmitter interface number;

based on the configuration response messages from the first set and second set of ONUs, associating, in a database, each ONU in the first set of ONUs with the first wavelength and each ONU in the second set of ONUs with the second wavelength; and using the database:

transmitting downstream traffic destined for any ONU in the first set of ONUs at the first wavelength; and transmitting downstream traffic for any ONU in the second set of ONUs at the second wavelength.

11. The method of claim 10, wherein the first configuration message and the second configuration message further comprise ONU serial number requests, and the configuration response messages received from the ONUs further comprise ONU serial numbers.

12. The method of claim 10, wherein:

the first and second configuration messages comprise "IDENT" attributes;

each configuration response message comprises an "IND" attribute;

the "IDENT" attributes in the first and second configuration messages comprise the transmitter interface numbers; and the "IND" attribute in each configuration response message comprises the transmitter interface number.

13. The method of claim 10, wherein:

the first and second configuration messages comprise "Configure Port-ID" messages; and each configuration response message comprises an acknowledge message, each acknowledge message comprising a copy of a plurality of bytes included in the associated "Configure Port-ID" message.

14. The method of claim 10, wherein:

each ONU in the first set of ONUs is associated in the database with the first wavelength by associating each ONU in the first set of ONUs with a first transmitter interface transmitting at the first wavelength; and each ONU in the second set of ONUs is associated in the database with the second wavelength by associating each ONU in the second set of ONUs with a second transmitter interface transmitting at the second wavelength.

15. An optical line terminal (OLT) for managing network components in a passive optical network (PON), comprising:

a first transmitter interface configured to transmit a first configuration message on the PON, wherein the first configuration message comprises a first transmitter interface number;

a second transmitter interface configured to transmit a second configuration message on the PON at approximately the same time as the first message, wherein the second configuration message comprises a second transmitter interface number, and a receiver configured to:

receive a configuration response message from each of one or more optical network units (ONUs) in a first set of ONUs that comprises the first transmitter interface number;

receive a configuration response message from each of one or more ONUs in a second set of ONUs that comprises the second transmitter interface number; and based on the response configuration messages from the first set and second set of ONUs, associate, in a database, each ONU in the first set of ONUs with the first transmitter interface and each ONU in the second set of ONUs with the second transmitter interface;

wherein the first transmitter interface is further configured to, using the database, transmit downstream traffic destined for any ONU in the first set of ONUs; and wherein the second transmitter interface is further configured to, using the database, transmit downstream traffic destined for any ONU in the second set of ONUs.

16. The OLT of claim 15, wherein the first configuration message and the second configuration message further comprise ONU serial number requests, and the configuration response messages received from the ONUs further comprise ONU serial numbers.

17. The OLT of claim 15, wherein:
the first and second configuration messages comprise "IDENT" attributes;
each configuration response message comprises an "IND" attribute;
the "IDENT" attributes in the first and second configuration messages comprise the transmitter interface numbers; and
the "IND" attribute in each configuration response message comprises the transmitter interface number.

18. The OLT of claim 15, wherein:
the first and second configuration messages comprise "Configure Port-ID" messages; and
each configuration response message comprises an acknowledge message, each acknowledge message comprising a copy of a plurality of bytes included in the associated "Configure Port-ID" message.

* * * * *

UNITED STATES PATENT AND TRADEMARK OFFICE
CERTIFICATE OF CORRECTION

| | |
|---|---|
| PATENT NO. | : 7,603,036 B2 |
| APPLICATION NO. | : 11/552696 |
| DATED | : October 13, 2009 |
| INVENTOR(S) | : Palacharla et al. |

It is certified that error appears in the above-identified patent and that said Letters Patent is hereby corrected as shown below:

In the Specification

Column 4, Line 16 after "a greater bit rate than is traffic in" please remove "Bun" and please insert -- $\lambda_u$, --.

Signed and Sealed this
Nineteenth Day of November, 2013

Teresa Stanek Rea
*Deputy Director of the United States Patent and Trademark Office*